(12) United States Patent
Mitsugi et al.

(10) Patent No.: US 11,453,374 B2
(45) Date of Patent: Sep. 27, 2022

(54) DISC BRAKE AND PLANETARY GEAR REDUCTION MECHANISM

(71) Applicant: Hitachi Astemo, Ltd., Ibaraki (JP)

(72) Inventors: Takashi Mitsugi, Ibaraki (JP); Daisuke Hibi, Ibaraki (JP); Takayasu Sakashita, Ibaraki (JP); Jun Watanabe, Ibaraki (JP); Rikiya Yoshizu, Ibaraki (JP); Atsushi Odaira, Ibaraki (JP); Takuya Usui, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 76 days.

(21) Appl. No.: 16/979,598

(22) PCT Filed: Mar. 27, 2019

(86) PCT No.: PCT/JP2019/013265
§ 371 (c)(1),
(2) Date: Sep. 10, 2020

(87) PCT Pub. No.: WO2019/198509
PCT Pub. Date: Oct. 17, 2019

(65) Prior Publication Data
US 2021/0039620 A1    Feb. 11, 2021

(30) Foreign Application Priority Data
Apr. 11, 2018    (JP) .............................. JP2018-076222

(51) Int. Cl.
*B60T 13/74* (2006.01)
*F16D 55/226* (2006.01)
(Continued)

(52) U.S. Cl.
CPC .......... *B60T 13/746* (2013.01); *F16D 55/226* (2013.01); *F16D 65/183* (2013.01);
(Continued)

(58) Field of Classification Search
CPC .. F16D 55/226; F16D 65/183; F16D 2121/24; F16D 2125/50; B60T 13/741;
(Continued)

(56) References Cited

U.S. PATENT DOCUMENTS

2008/0293534 A1* 11/2008 Dettenberger ......... H02K 7/116
475/154
2013/0180811 A1*  7/2013 Poertzgen ............... F16D 65/18
188/156
(Continued)

FOREIGN PATENT DOCUMENTS

JP    2014-214830 A    11/2014
JP    2015-155294 A     8/2015
(Continued)

OTHER PUBLICATIONS

International Search Report dated Jun. 25, 2019 for WO 2019/198509 A1 (3 pages).

*Primary Examiner* — Nicholas J Lane
(74) *Attorney, Agent, or Firm* — Venjuris, P.C.

(57) ABSTRACT

To provide a disc brake having a planetary gear reduction mechanism that may be satisfactory costly and achieve improved reliability, a planetary gear reduction mechanism of a disc brake according to the present disclosure includes a sun gear having an input gear portion to which rotation from a motor is transmitted and an output gear portion extending axially from a radial central region of the input gear portion, a plurality of planetary gears configured to mesh with the output gear portion of the sun gear, and an internal gear configured to mesh with each planetary gear, and the internal gear has a cylindrical support portion configured to rotatably support the sun gear. Accordingly, at the time of assembly, the axis of the sun gear and the axis of the internal gear may be arranged substantially concen- (Continued)

trically, which may result in improved reliability and cost satisfaction.

9 Claims, 13 Drawing Sheets

(51) Int. Cl.
| | |
|---|---|
| F16D 65/18 | (2006.01) |
| F16H 1/28 | (2006.01) |
| F16H 55/17 | (2006.01) |
| F16H 57/08 | (2006.01) |
| B60T 1/06 | (2006.01) |
| F16D 121/24 | (2012.01) |
| F16D 125/40 | (2012.01) |
| F16D 125/50 | (2012.01) |

(52) U.S. Cl.
CPC ............... *F16H 1/28* (2013.01); *F16H 55/17* (2013.01); *F16H 57/08* (2013.01); *B60T 1/065* (2013.01); *F16D 2121/24* (2013.01); *F16D 2125/40* (2013.01); *F16D 2125/50* (2013.01); *F16H 2055/176* (2013.01)

(58) Field of Classification Search
CPC .......... B60T 13/746; F16H 1/28; F16H 57/08; F16H 55/17; F16H 2055/176
See application file for complete search history.

(56) References Cited

U.S. PATENT DOCUMENTS

| | | | |
|---|---|---|---|
| 2014/0041975 A1* | 2/2014 | Takewaki | F16D 55/225 188/361 |
| 2015/0233434 A1* | 8/2015 | Hayashi | F16D 65/0006 188/72.6 |
| 2016/0032993 A1* | 2/2016 | Takei | B60T 8/171 701/70 |
| 2017/0219036 A1* | 8/2017 | Song | F16D 55/226 |
| 2017/0343065 A1* | 11/2017 | Okada | F16D 65/183 |

FOREIGN PATENT DOCUMENTS

| | | |
|---|---|---|
| JP | 2016-125545 A | 7/2016 |
| JP | 2017-133584 A | 8/2017 |

* cited by examiner

DISC BRAKE AND PLANETARY GEAR REDUCTION MECHANISM

CROSS REFERENCE TO RELATED APPLICATIONS

This application is a national phase of PCT application No. PCT/JP2019/013265, filed on 27 Mar. 2019, which claims priority from Japanese patent application No. 2018-076222, filed on 11 Apr. 2018, all of which are incorporated herein by reference.

TECHNICAL FIELD

The present disclosure relates to a disc brake for use in the braking of a vehicle and a planetary gear reduction mechanism provided in the disc brake.

BACKGROUND

A disc brake described in, for example, Patent Document 1 includes a pair of pads disposed on both axial sides of a rotor interposed therebetween, a piston which pushes one of the pair of pads against the rotor, a caliper body having a cylinder in which the piston is movably accommodated, an electric motor provided on the caliper body, a planetary gear reduction mechanism which boosts and transmits rotation of the electric motor, a casing mounted to the caliper body in which the planetary gear reduction mechanism and the electric motor are accommodated, and a piston propulsion mechanism which propels the piston to a braking position by rotation transmitted from the planetary gear reduction mechanism. The planetary gear reduction mechanism is accommodated inside the casing, i.e., inside a housing mounted to the caliper body and a cover closing one end opening in the housing. Then, the planetary gear reduction mechanism includes a sun gear to which the rotation from the electric motor is transmitted, the sun gear having a shaft with one end side pivotally supported on the cover, a plurality of planetary gears meshing with the sun gear, and an internal gear meshing with each planetary gear and supported on the housing.

PRIOR ART DOCUMENT

Patent Document

Patent Document 1: Japanese Patent Laid-Open Publication No. 2014-214830

SUMMARY OF THE INVENTION

Problem to be Solved

As described above, in the disc brake according to Patent Document 1, the sun gear is rotatably supported by the shaft pivotally supported on the cover, whereas the internal gear is non-rotatably supported on the housing, so that a variation in the distance between the axis of the sun gear and the axis of the internal gear increases during assembly. That is, there is a possibility of the sun gear and the internal gear being not concentrically arranged with good accuracy. As a result, meshing between the sun gear and each planetary gear and meshing between each planetary gear and the internal gear become unstable, which may ensure wear durability and the like. As a countermeasure against this, it may be necessary to improve the shape accuracy of the sun gear, each planetary gear, and the internal gear or the assembling accuracy of the sun gear, each planetary gear, and the internal gear, which is economically disadvantageous.

Then, in view of the above-mentioned problems, it is an object of the present disclosure to provide a planetary gear reduction mechanism and a disc brake having the planetary gear reduction mechanism which may be satisfactory costly cost and achieve improved reliability.

Means to Solve the Problem

As a means to solve the above problems, a disc brake according to the present disclosure includes a pair of pads each disposed on both sides of an axial direction a rotor interposed therebetween, a piston configured to push at least one of the pair of pads against the rotor, a caliper body including a cylinder in which the piston is movably accommodated, a motor provided on the caliper body, a planetary gear reduction mechanism configured to boost and transmit rotation from the motor, and a piston propulsion mechanism configured to propel the piston to a braking position by rotation transmitted thereto from the planetary gear reduction mechanism. The planetary gear reduction mechanism includes a sun gear including an input portion to which the rotation from the motor is transmitted and a gear portion extending axially from a radial central region of the input portion, a plurality of planetary gears arranged to mesh with the gear portion of the sun gear and surround the gear portion, and an internal gear arranged to mesh with each planetary gear and surround the planetary gear, and the internal gear includes a support portion configured to rotatably support the sun gear.

Further, a disc brake according to the present disclosure includes a pair of pads disposed on both sides of an axial direction of a rotor interposed therebetween, a piston configured to push at least one of the pair of pads against the rotor, a caliper body including a cylinder in which the piston is movably accommodated, a motor provided on the caliper body, a planetary gear reduction mechanism configured to boost and transmit rotation from the motor, and a piston propulsion mechanism to propel the piston to a braking position by rotation from the planetary gear reduction mechanism. The planetary gear reduction mechanism includes a sun gear including an input portion to which the rotation from the motor is transmitted and a gear portion extending axially from a radial central region of the input portion, a plurality of planetary gears arranged to mesh with the gear portion of the sun gear and surround the gear portion, and an internal gear arranged to mesh with each planetary gear and surround the planetary gear. The internal gear has a support portion having a tubular shape and configured to rotatably support the sun gear on an outer peripheral surface thereof.

Furthermore, a planetary gear reduction mechanism according to the present disclosure includes a sun gear including an input portion to which rotation from a motor is transmitted and a gear portion extending axially from a radial central region of the input portion, a plurality of planetary gears arranged to mesh with the gear portion of the sun gear and surround the gear portion, and an internal gear arranged to mesh with each planetary gear and surround the planetary gear, wherein the internal gear has a support portion configured to rotatably support the sun gear.

Effect of the Invention

A disc brake and a planetary gear reduction mechanism according to the present disclosure may be satisfactory costly and achieve improved reliability.

DETAILED DESCRIPTION TO EXECUTE THE INVENTION

Hereinafter, the present embodiment will be described in detail with reference to FIGS. 1 to 16.

In the following description, for convenience of description, the right side and the left side of FIGS. 1, 2, 7, 9, 10, and 14 will be appropriately described by being referred to as "one end side" and "the other end side", respectively.

First, a disc brake 1a according to a first embodiment will be described with reference to FIGS. 1 to 8.

Figure 1:
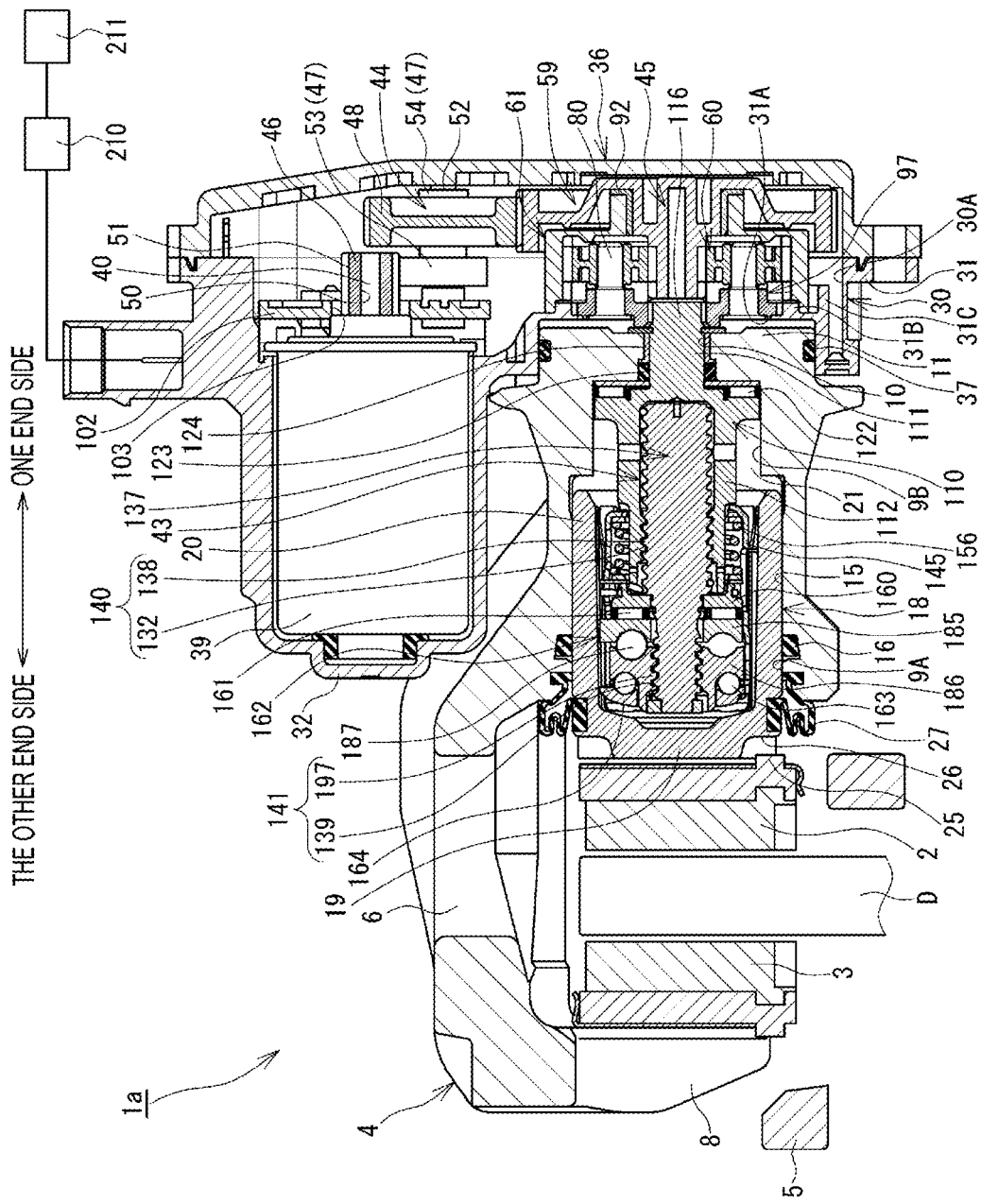
FIG. 1 is a cross-sectional view of a disc brake according to a first embodiment.

As illustrated in FIG. 1, the disc brake 1a according to the first embodiment is provided with a pair of an inner brake pad 2 and an outer brake pad 3 disposed on both axis sides of a disc rotor D interposed therebetween, which is mounted to a rotating part of a vehicle, and is also provided with a caliper 4. The disc brake 1a according to the first embodiment is configured as being of a caliper floating type. The pair of the inner brake pad 2 and the outer brake pad 3 and the caliper 4 are supported on a bracket 5 which is fixed to a non-rotating part such as a knuckle of the vehicle, so as to be movable in the axial direction of the disc rotor D.

As illustrated in FIG. 1, a caliper body 6 which is a main body of the caliper 4 has a cylinder portion 7 located on the base side thereof facing the inner brake pad 2 at the vehicle inner side and a claw portion 8 located on the tip side thereof facing the outer brake pad 3 at the vehicle outer side. The cylinder portion 7 is formed with a bottomed cylinder 15 which has an open inner brake pad 2 side forming a large diameter opening 9A and an opposite side closed by a bottom wall 11 having a hole 10. A small diameter opening 9B which is formed continuously with the large diameter opening 9A and has a smaller diameter than that of the large diameter opening 9A is formed at the bottom wall 11 side in the cylinder 15. A piston seal 16 is arranged on the other end side inner peripheral surface of the larger diameter opening 9A in the cylinder 15.

A piston 18 is formed to have a bottomed cup shape composed of a bottom portion 19 and a cylindrical portion 20. The piston 18 is accommodated in the cylinder 15 such that the bottom portion 19 thereof faces the inner brake pad 2. The piston 18 is installed in the large diameter opening 9A of the cylinder 15 so as to be axially movable while being in contact with the piston seal 16. The piston seal 16 defines a hydraulic chamber 21 between the piston 18 and the bottom wall 11 of the cylinder 15. The hydraulic chamber 21 allows a hydraulic pressure from a hydraulic source (not illustrated) such as a master cylinder or a hydraulic control unit to be supplied thereto through a port (not illustrated) provided in the cylinder portion 7.

A plurality of rotation restricting vertical grooves 22 (see FIGS. 7 and 8) are formed along the circumferential direction in the inner peripheral surface of the piston 18. The bottom portion 19 of the piston 18 is formed with a recess 25 at the outer peripheral side of the other end surface facing the inner brake pad 2. The recess 25 is engaged with a projection 26 formed on the back surface of the inner brake pad 2. With this engagement, the piston 18 is restricted so as not to be rotatable relative to the cylinder 15, particularly to the caliper body 6. Further, a dust boot 27 is interposed between the outer peripheral surface of the piston 18 at the bottom portion 19 side and the inner peripheral surface of the large diameter opening 9A in the cylinder 15 to prevent foreign substances from entering the cylinder 15.

Figure 2:
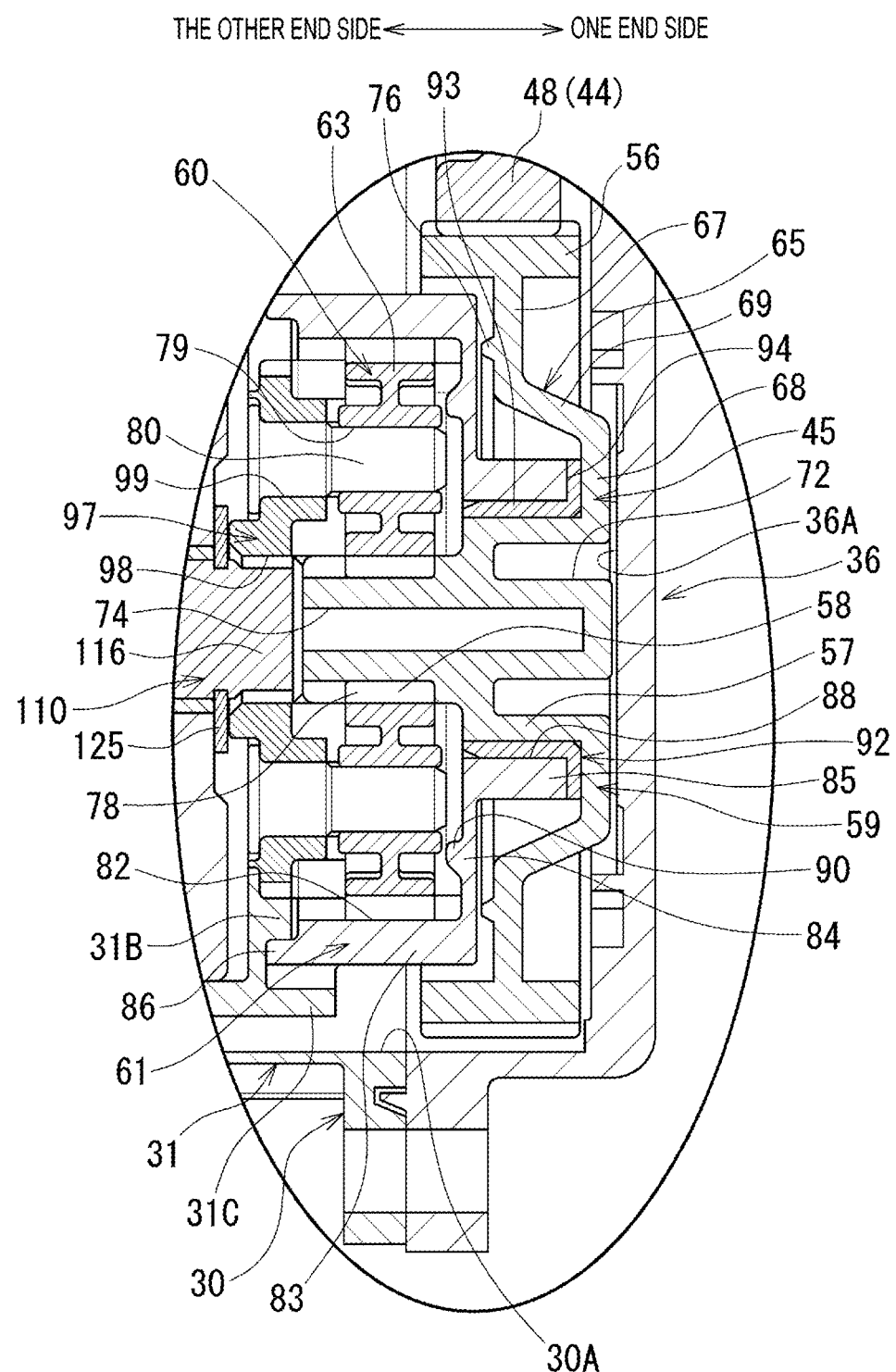
FIG. 2 is an enlarged view of a major part of FIG. 1.

A housing 30 in which a spur gear multi-stage reduction mechanism 44 and a planetary gear reduction mechanism 45 are accommodated is mounted to the bottom wall 11 side of the cylinder 15 of the caliper body 6. An opening 30A is formed in one end of the housing 30. A cover member 36 is mounted to the end of the housing 30 so as to hermetically close the opening 30A. A seal member 37 is provided between the housing 30 and the cylinder portion 7. The inside of the housing 30 is maintained airtight by the seal member 37. Further, as illustrated in FIG. 2, the cover member 36 has an accommodating recess 36A formed in a surface facing a sun gear 59 of the planetary gear reduction mechanism 45 (to be described later) and configured to accommodate therein an inner annular wall portion 68 of an annular wall portion 65 and one end of a boss portion 57 of the sun gear 59.

The housing 30 is composed of a first housing portion 31 and a second housing portion 32, the first housing portion 31 covering the outer periphery of the bottom wall 11 of the cylinder 15 to accommodate the spur gear multi-stage reduction mechanism 44 and the planetary gear reduction mechanism 45 (to be described later), and the second housing portion 32 integrally protruding from the first housing portion 31 in a bottomed cylindrical shape to accommodate a motor 39. As such, the housing 30 is configured to accommodate the motor 39 arranged next to the caliper body 6 by the bottomed cylindrical second housing portion 32. The first housing portion 31 has a mounting opening 31A through which a polygonal shaft portion 116 of a base nut 110 of a rotary-to-linear motion conversion mechanism 43

(to be described later) is inserted, an inner annular support wall portion 31B protruding around the mounting opening 31A, an outer annular support wall portion 31C protruding radially outward from the inner annular support wall portion 31B with an interval therebetween, and a plurality of engaging grooves (not illustrated) formed in the outer annular support wall portion 31C at an interval in the circumferential direction.

As illustrated in FIG. 1, the caliper body 6 includes the spur gear multi-stage reduction mechanism 44 and the planetary gear reduction mechanism 45 which increase the drive force by the motor 39 and the rotary-to-linear motion conversion mechanism 43 which propels the piston 18 and holds the piston 18 at a braking position. As illustrated in FIGS. 1 and 2, the spur gear multi-stage reduction mechanism 44 includes a pinion gear 46, a reduction gear 47, and a non-reduction spur gear 48. As illustrated in FIG. 1, the pinion gear 46 has a gear portion 51 and a bore 50 formed axially about the radial center of the gear portion 51 into which a rotation shaft 40 of the motor 39 is fixedly press-fitted. The reduction gear 47 is integrally composed of a large gear portion 53 having a large diameter to mesh with the gear portion 51 of the pinion gear 46 and a small gear portion 54 having a small diameter to extend axially from a radial central portion of the large gear portion 53 toward one end side. The reduction gear 47 is rotatably supported by a shaft 52 which has one end supported on the cover member 36 and the other end supported on a holder 102 (to be described later).

Figure 3:
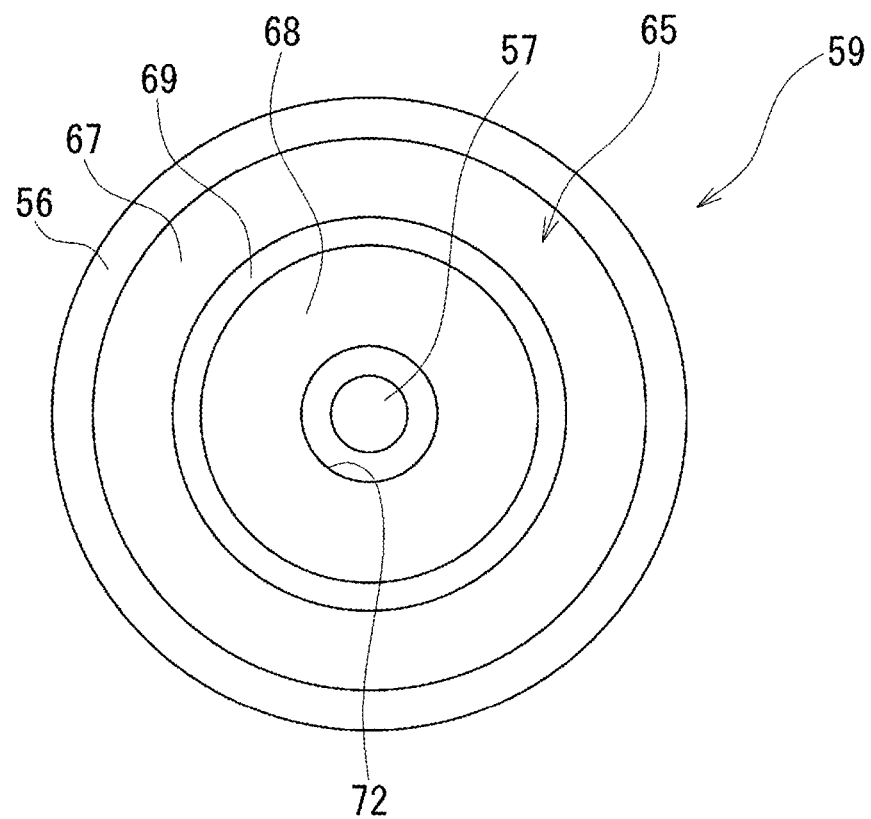
FIG. 3 is a plan view of a sun gear employed in the disc brake of FIG. 1.
Figure 4:
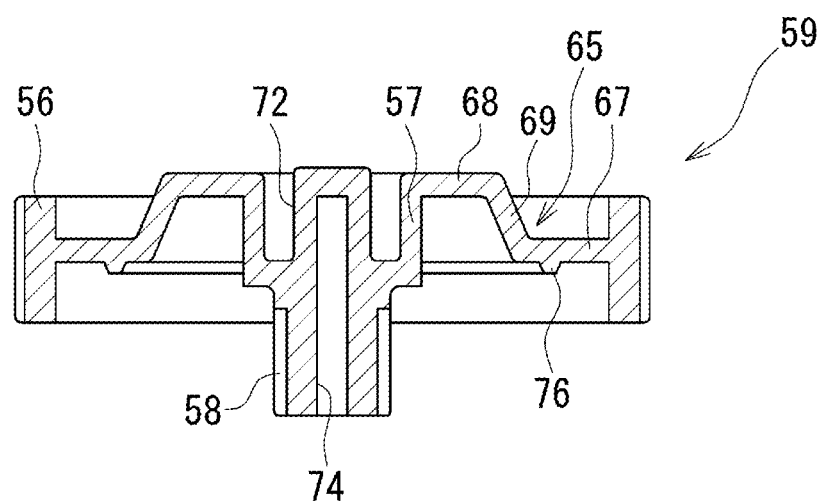
FIG. 4 is a cross-sectional view of the sun gear of FIG. 3.

The small gear portion 54 of the reduction gear 47 meshes with the non-reduction spur gear 48. The non-reduction spur gear 48 is rotatably supported by a shaft (not illustrated) having the other end supported on the holder 102. As illustrated in FIG. 2, the planetary gear reduction mechanism 45 includes the sun gear 59, a plurality of (four in the present embodiment) planetary gears 60, an internal gear 61, and a carrier 97. As illustrated in FIGS. 2 to 4, the sun gear 59 includes an input gear portion 56 which meshes with the non-reduction spur gear 48 of the spur gear multi-stage reduction mechanism 44 to which rotation from the motor 39 is transmitted, the boss portion 57 integrally extending axially from the radial central region of the input gear portion 56 toward the other end side, and an output gear portion 58 integrally extending axially from the boss portion 57 toward the other end side. The input gear portion corresponds to an input portion. The output gear portion corresponds to a gear portion. The sun gear 59 is arranged concentrically with a push rod 137 (base nut 110) of the rotary-to-linear motion conversion mechanism 43 (to be described later). The outer diameter of the input gear portion 56 is much larger than the outer diameter of the boss portion 57. The outer diameter of the boss portion 57 is larger than the outer diameter of the output gear portion 58. The boss portion 57 slightly protrudes to one end side from the input gear portion 56. The output gear portion 58 protrudes to the other end side from the input gear portion 56.

The input gear portion 56 and the boss portion 57 are integrally connected to each other by the annular wall portion 65. The annular wall portion 65 has an outer annular wall portion 67 having the outer peripheral surface connected to a substantially axially central portion of the inner peripheral surface of the input gear portion 56, the inner annular wall portion 68 having the inner peripheral surface connected to one axial end of the boss portion 57, and a tapered annular wall portion 69 connected to the inner peripheral surface of the outer annular wall portion 67 and the outer peripheral surface of the inner annular wall portion 68 to have a decreasing diameter toward one end side. An annular groove 72 is formed in one end surface of the boss portion 57. The bottom surface of the annular groove 72 is located on substantially the same plane as the other end surface of the outer annular wall portion 67. A recess 74 is formed in the radial center of the other end surface of the output gear portion 58. The recess 74 is formed within a range from the output gear portion 58 to the boss portion 57. The bottom surface of the recess 74 is located on substantially the same plane as the other end surface of the inner annular wall portion 68. A stopper 76 which protrudes to the other end side extends annularly on the other end surface of the outer annular wall portion 67 of the annular wall portion 65. The inner annular wall portion 68 of the annular wall portion 65 and one end of the boss portion 57 of the sun gear 59 are accommodated in the accommodating recess 36A of the cover member 36.

As illustrated in FIG. 2, each planetary gear 60 meshes with the output gear portion 58 of the sun gear 59, and a plurality of planetary gears 60 are arranged so as to surround the output gear portion 58. Specifically, the planetary gears 60 are equidistantly arranged around the output gear portion 58 of the sun gear 59. Each planetary gear 60 has a gear portion 78 which meshes with the output gear portion 58 of the sun gear 59 and a bore 79 formed so as to penetrate axially a radial central portion of the gear portion 78. A pin 80 which is erected at one end side from the carrier 97 (to be described later) is rotatably inserted through the bore 79.

Figure 6:
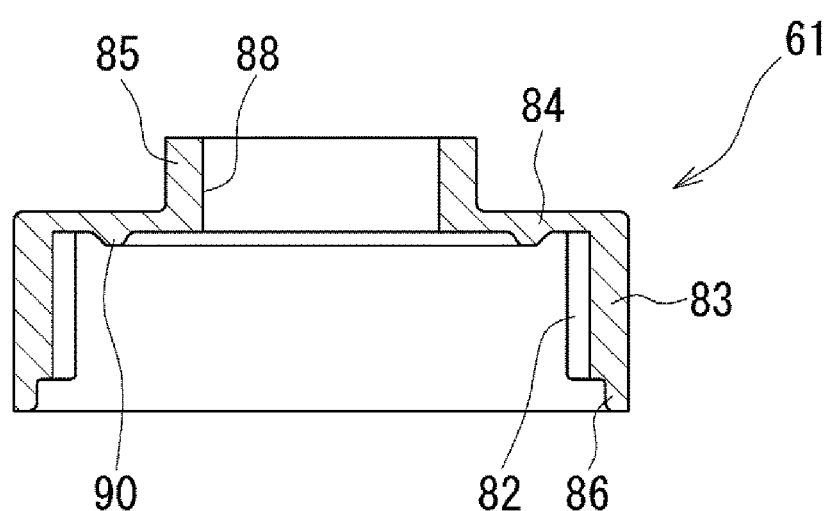
FIG. 6 is a cross-sectional view of an internal gear employed in the disc brake of FIG. 1.

As illustrated in FIGS. 2 and 6, the internal gear 61 has a tubular shape as a whole and is arranged to mesh with each planetary gear 60 and surround the planetary gear 60. Specifically, the internal gear 61 has an internal gear portion 83 having inner teeth 82 formed on the inner peripheral surface thereof to mesh with the gear portion 78 of each planetary gear 60, an annular wall portion 84 integrally extending from one end of the internal gear portion 83 toward the radial center side to restrict axial movement of each planetary gear 60, a cylindrical support portion 85 integrally extending axially in a tubular shape from the inner peripheral side end of the annular wall portion 84 toward one end side, and a cylindrical engaging portion 86 integrally extending in a tubular shape from the other end side end of the internal gear portion 83 toward the other end side. The cylindrical support portion 85 corresponds to a support portion.

An annular surface 88 is formed on the inner peripheral surface of the cylindrical support portion 85 to extend axially. The inner peripheral surface of the cylindrical engaging portion 86 is formed to have a larger diameter than that of the inner peripheral surface of the inner teeth 82 of the internal gear portion 83. A plurality of convex portions (not illustrated) are formed at an interval in the circumferential direction on the outer peripheral surface within the range from the cylindrical engaging portion 86 to the internal gear portion 83 to protrude radially outward. A stopper 90 extends annularly on the other end surface of the annular wall portion 84 of the internal gear 61. The stopper 90 may restrict movement of each planetary gear 60 to one end side (in the axial direction).

Figure 5:
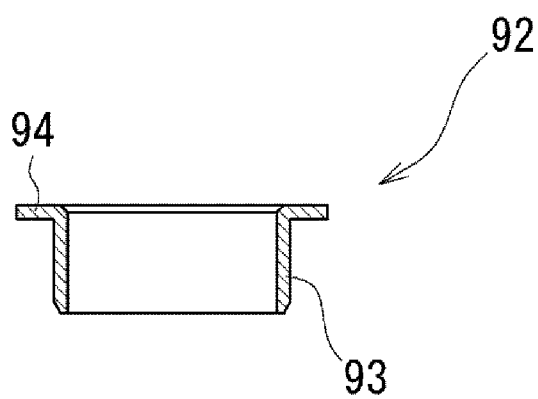
FIG. 5 is a cross-sectional view of a bush employed in the disc brake of FIG. 1.

As illustrated in FIGS. 2 and 5, the cylindrical support portion 85 of the internal gear 61 is arranged radially outside the boss portion 57 of the sun gear 59 so as to face each other, and a bush 92 is arranged between the boss portion 57 of the sun gear 59 and the cylindrical support portion 85 of the internal gear 61. The bush 92 is composed of a cylindrical portion 93 arranged between the boss portion 57 of the sun gear 59 and the cylindrical support portion 85 of the internal gear 61 and an annular flange portion 94 extending outward from one axial end of the cylindrical portion 93. The outer diameter of the flange portion 94 is substantially the same as the outer diameter of the cylindrical support portion 85 of the internal gear 61. The cylindrical portion 93 of the bush 92 comes into contact with the outer peripheral surface of the boss portion 57 of the sun gear 59 and comes into contact with the inner peripheral surface (annular surface 88) of the cylindrical support portion 85 of the internal gear 61. The flange portion 94 of the bush 92 comes into contact with one end surface of the cylindrical support portion 85 of the internal gear 61 and comes into contact with the other end surface of the inner annular wall portion 68 of the sun gear 59. The bush 92 may be integrally molded with the boss portion 57 of the sun gear 59, or may be integrally molded with the cylindrical support portion 85 of the internal gear 61.

Then, as illustrated in FIG. 2, the internal gear 61 is arranged between the inner annular support wall portion 31B and the outer annular support wall portion 31C such that the inner peripheral surface of the cylindrical engaging portion 86 comes into contact with the outer peripheral surface of the inner annular support wall portion 31B of the first housing portion 31, and the respective convex portions thereof are engaged with respective engaging grooves formed in the outer annular support wall portion 31C. As a result, the internal gear 61 is restricted in radial movement by the housing 30 and is also non-rotatably supported. Further, one end surface of the annular wall portion 84 of the internal gear 61 comes into contact with the stopper 76 formed on the annular wall portion 65 (outer annular wall portion 67) of the sun gear 59, whereby the internal gear 61 is also restricted in axial movement with respect to the housing 30. Meanwhile, the boss portion 57 of the sun gear 59 is rotatably supported on the cylindrical support portion 85 of the internal gear 61 via the bush 92.

As illustrated in FIGS. 1 and 2, the carrier 97 is formed in a disc shape and has a polygonal hole 98 formed in a substantially radial center thereof. A plurality of pin bores 99 are formed in the carrier 97 at an interval in the circumferential direction. The pin 80 is fixedly press-fitted into each pin bore 99. Each pin 80 protrudes to one end side from the carrier 97. Each pin 80 is rotatably inserted through the bore 79 in each planetary gear 60. Then, the polygonal shaft portion 116 of the base nut 110 of the rotary-to-linear motion conversion mechanism 43 (to be described later) is fitted into the polygonal hole 98 in the carrier 97, which allows the carrier 97 and the base nut 110 to mutually transmit a rotational torque.

As illustrated in FIG. 1, the motor 39 is supported on the housing 30 and the holder 102 as each mounting portion (not illustrated) protruding radially outward of the motor 39 is sandwiched between the holder 102 and the housing 30. The holder 102 supports the shaft 52 of the reduction gear 47 and also supports the shaft of the non-reduction spur gear 48. Further, the holder 102 is formed with a rotation shaft insertion through-hole 103 for insertion of the pinion gear 46 into which the rotation shaft 40 of the motor 39 is fixedly press-fitted. A plurality of terminal insertion through-holes (not illustrated) through which a plurality of motor terminals (not illustrated) of the motor 39 are inserted are formed around the rotation shaft insertion through-hole 103 so as to correspond to the respective motor terminals. A harness (not illustrated) is connected to each motor terminal of the motor 39.

In the present embodiment, in order to obtain the rotational force for propelling the piston 18, the spur gear multi-stage reduction mechanism 44 and the planetary gear reduction mechanism 45 are employed as a speed reduction mechanism that increases the drive force by the motor 39, but the speed reduction mechanism may be configured with only the planetary gear reduction mechanism 45. Further, a speed reducer according to other known techniques such as a cycloid speed reducer or a wave reducer may be combined with the planetary gear reduction mechanism 45.

Next, the rotary-to-linear motion conversion mechanism 43 will be specifically described with reference to FIGS. 1, 7, and 8. In the following description, for convenience of description, the right side and the left side of FIGS. 1 and 7 will be appropriately described by being referred to as "one end side" and "the other end side", respectively. The rotary-to-linear motion conversion mechanism 43 corresponds to a piston propulsion mechanism.

As illustrated in FIG. 1, the rotary-to-linear motion conversion mechanism 43 converts a rotary motion from the spur gear multi-stage reduction mechanism 44 and the planetary gear reduction mechanism 45, i.e., a rotary motion from the motor 39 into a motion in the linear direction (hereinafter, referred to as linear motion for convenience) to impart a thrust force to the piston 18 and to hold the piston 18 at a braking position. The rotary-to-linear motion conversion mechanism 43 includes the base nut 110 rotatably supported by the rotary motion transmitted from the spur gear multi-stage reduction mechanism 44 and the planetary gear reduction mechanism 45, a push rod 137 screw-fitted into a female threaded portion 132 of the base nut 110 so as to be rotatable by rotation of the base nut 110 and also linearly movably supported, and a ball and ramp mechanism 162 screw-fitted onto the push rod 137 so as to impart an axial thrust force to the piston 18 by rotation of the push rod 137. The rotary-to-linear motion conversion mechanism 43 is accommodated inside the cylinder 15 of the caliper body 6 between the bottom wall 11 and the piston 18.

Figure 7:
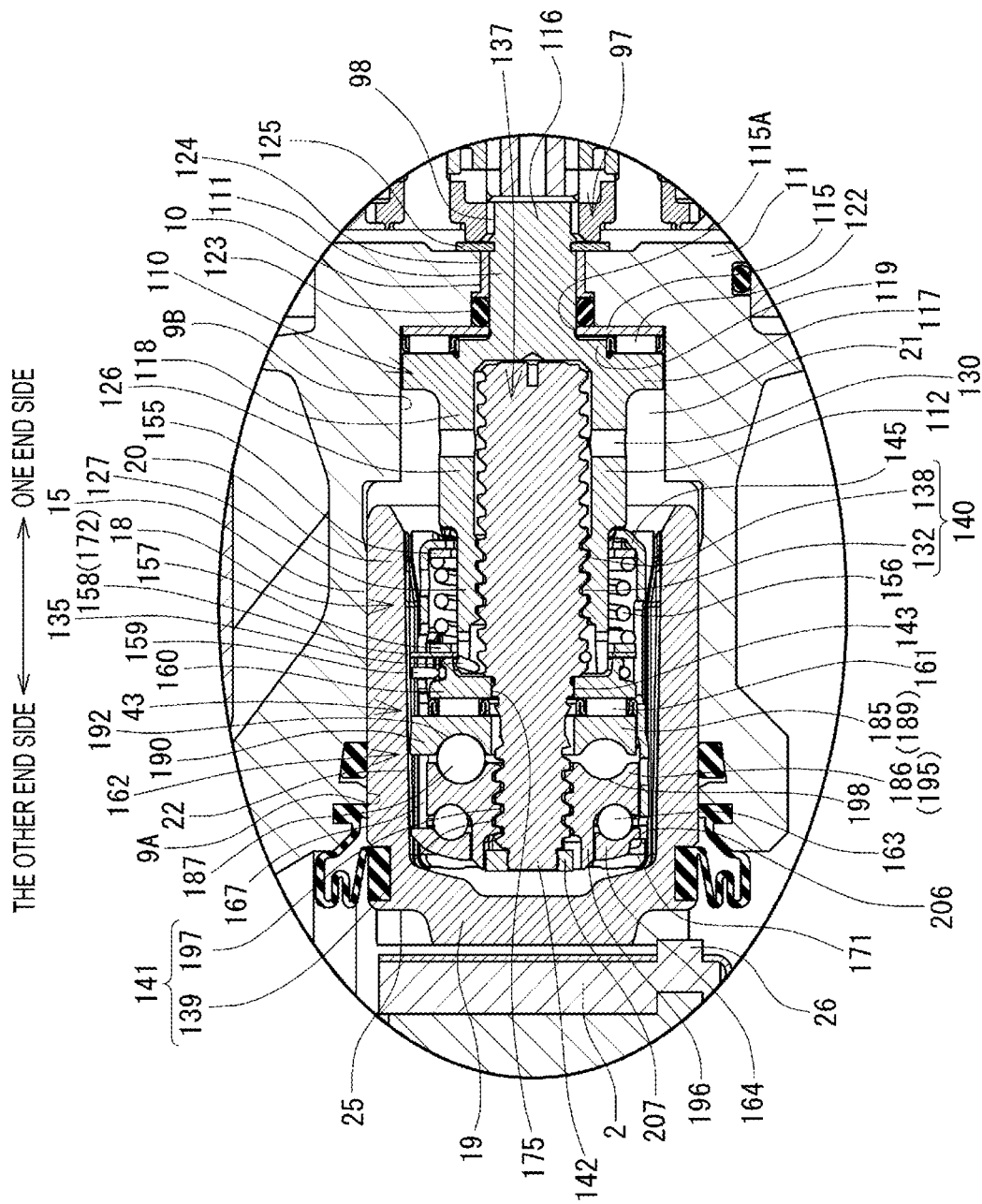
FIG. 7 is a cross-sectional view of a rotary-to-linear motion conversion mechanism employed in the disc brake of FIG. 1.
Figure 8:
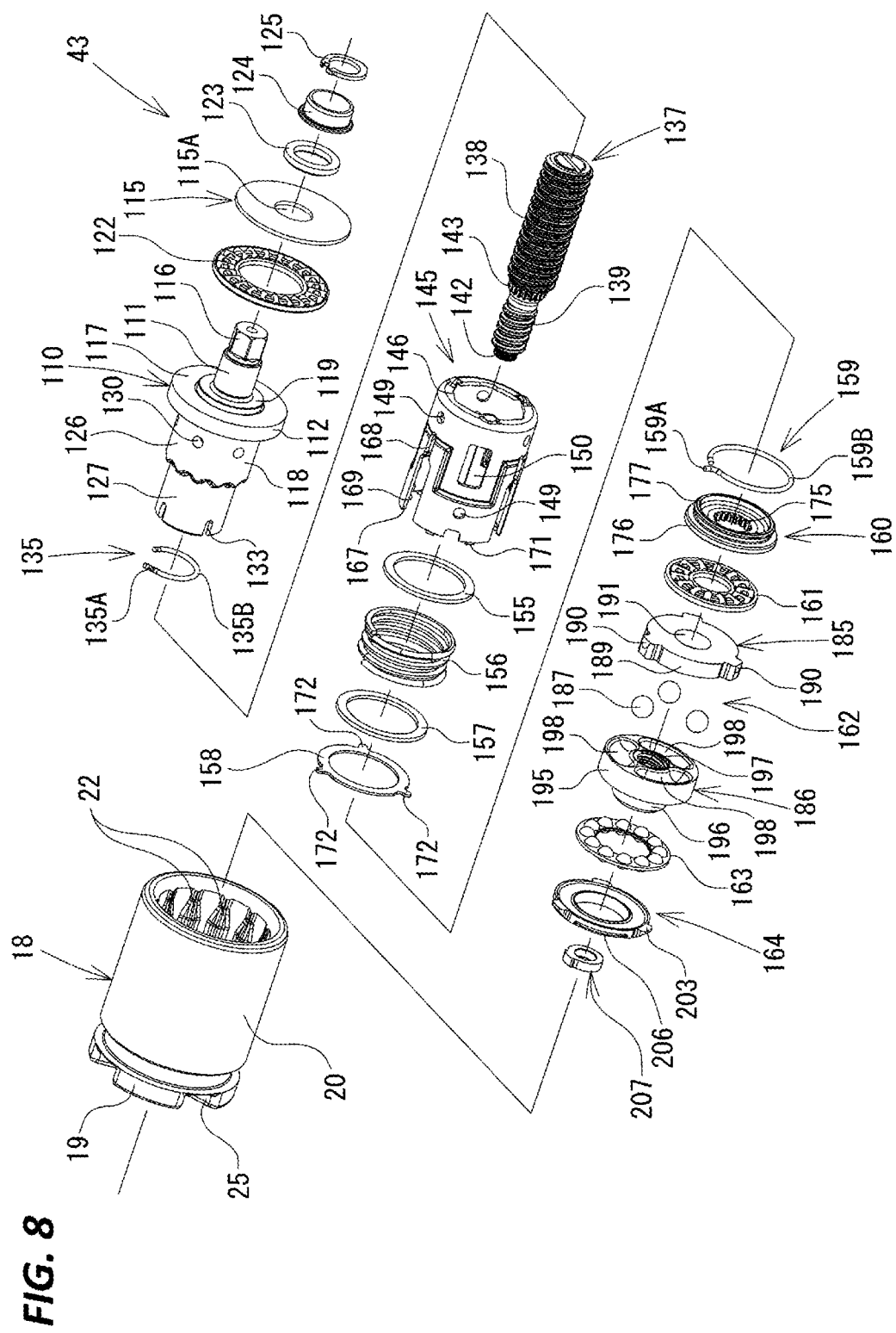
FIG. 8 is an exploded perspective view of the rotary-to-linear motion conversion mechanism employed in the disc brake of FIG. 1.
Figure 9:
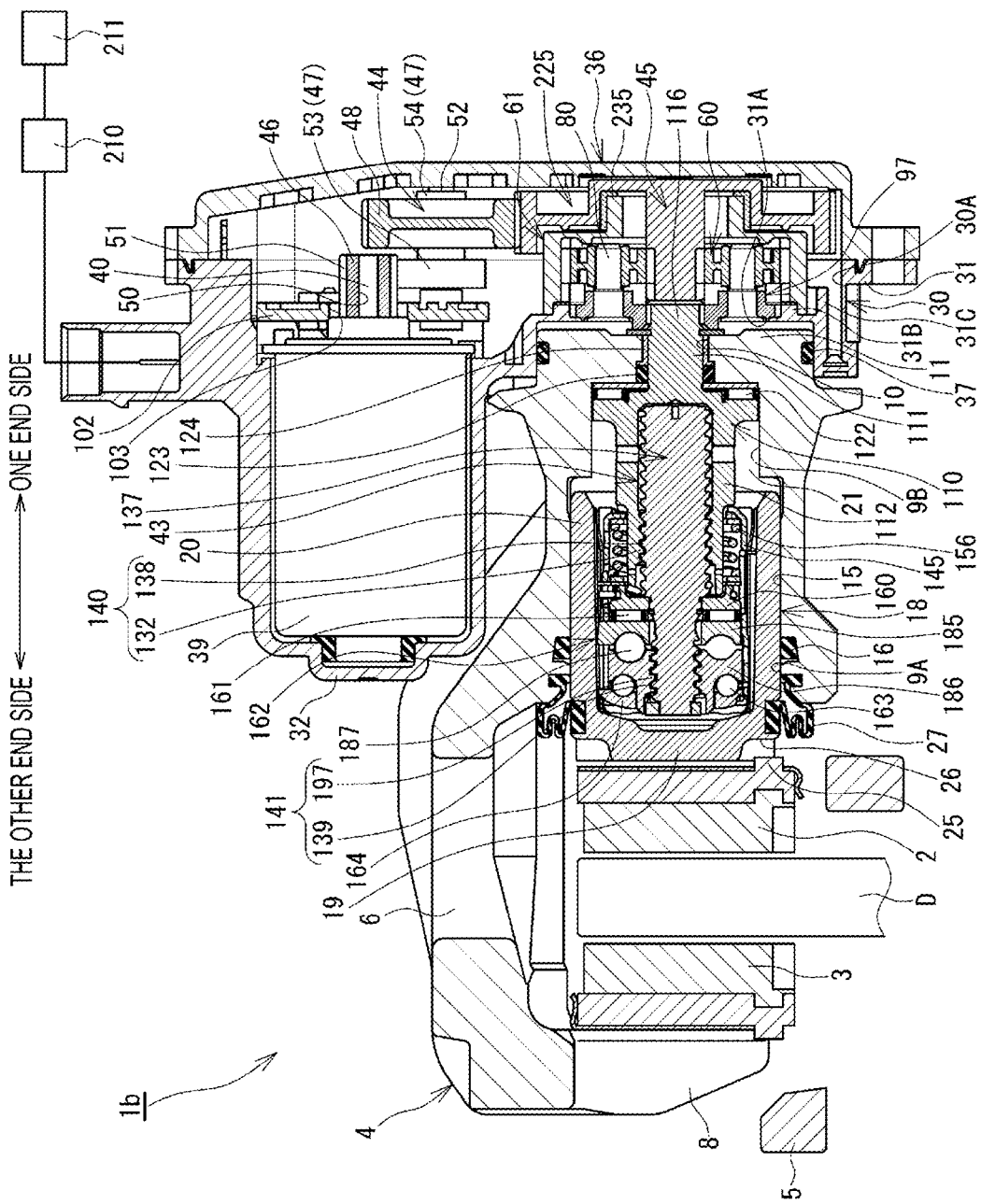
FIG. 9 is a cross-sectional view of a disc brake according to a second embodiment.

As illustrated in FIGS. 7 and 8, the base nut 110 is composed of a columnar portion 111 and a nut portion 112 integrally formed on the other end of the columnar portion 111. A washer 115 is arranged to come into contact with the bottom wall 11 of the cylinder 15. The columnar portion 111 of the base nut 110 is inserted into each of an insertion through-hole 115A in the washer 115 and the hole 10 formed in the bottom wall 11 of the cylinder 15. The polygonal shaft portion 116 is integrally connected to the tip of the columnar portion 111. The polygonal shaft portion 116 is inserted through the mounting opening 31A in the first housing portion 31 and is fitted into the polygonal hole 98 in the carrier 97. The nut portion 112 of the base nut 110 is formed to have a bottomed cylindrical shape. The nut portion 112 is composed of a circular wall portion 117 and a cylindrical portion 118 integrally protruding from the other end surface of the circular wall portion 117. The outer peripheral surface of the circular wall portion 117 is close to the inner wall surface of the small diameter opening 9B in the cylinder 15. A small diameter circular wall portion 119 integrally protrudes from a radial central portion of one end surface of the circular wall portion 117. The columnar portion 111 integrally protrudes from one end surface of the small diameter circular wall portion 119 toward one end side. The outer diameter of the columnar portion 111 is smaller than the outer diameter of the cylindrical portion 118 of the nut portion 112.

A thrust bearing 122 is arranged between the washer 115 and the circular wall portion 117 around the small diameter circular wall portion 119 formed on the nut portion 112 of the base nut 110. Then, the base nut 110 is rotatably supported on the bottom wall 11 of the cylinder 15 by the thrust bearing 122. A seal member 123 and a sleeve 124 are provided respectively between the outer peripheral surface of the columnar portion 111 of the base nut 110 and the hole 10 in the bottom wall 11 of the cylinder 15. Thus, the liquid tightness of the hydraulic chamber 21 is maintained. A snap ring 125 is mounted in an annular groove defined between the polygonal shaft portion 116 and the columnar portion 111 of the base nut 110. The snap ring 125 restricts axial movement of the base nut 110.

The cylindrical portion 118 of the nut portion 112 of the base nut 110 is composed of a large diameter cylindrical portion 126 located on one end side and a small diameter cylindrical portion 127 integrally connected to the large diameter cylindrical portion 126 and located on the other end side. One end of the large diameter cylindrical portion 126 is integrally connected to the circular wall portion 117. A plurality of through-holes 130 are formed in a circumferential wall portion of the large diameter cylindrical portion 126 to extend radially. The plurality of through-holes 130 are formed at an interval in the circumferential direction. The female threaded portion 132 is formed on the inner peripheral surface of the small diameter cylindrical portion 127 of the nut portion 112. A plurality of locking grooves 133 are formed at an interval in the circumferential direction in the other end surface of a circumferential wall portion of the small diameter cylindrical portion 127. In the present embodiment, the locking grooves 133 are formed at four locations.

A tip end 135A of a first spring clutch 135 is fitted into any one of the locking grooves 133 of the small diameter cylindrical portion 127 of the base nut 110 to impart rotational resistance against one-directional rotation. The first spring clutch 135 is composed of the tip end 135A facing radially outward and a coil portion 135B as a continuous one turn from the tip end 135A. Then, the tip end 135A of the first spring clutch 135 is fitted into any one of the locking grooves 133 of the small diameter cylindrical portion 127 of the base nut 110. The coil portion 135B of the first spring clutch 135 is wound in a thread groove at the other end side of a male threaded portion 138 of the push rod 137 (to be described later) in detail. The first spring clutch 135 is configured to impart the rotational resistance torque against the rotation direction (rotation direction at the time of "releasing") when the push rod 137 moves to the bottom wall 11 side of the cylinder 15 relative to the base nut 110, but allow rotation in the rotation direction (rotation direction at the time of "applying") when the push rod 137 moves to the bottom portion 19 side of the piston 18 relative to the base nut 110.

One end side of the push rod 137 is inserted into the nut portion 112 of the base nut 110. The male threaded portion 138 is formed on one end side of the push rod 137 so as to be screw-fitted into the female threaded portion 132 of the small diameter cylindrical portion 127 of the base nut 110. A first screw-fitting portion 140 between the male threaded portion 138 of the push rod 137 and the female threaded portion 132 of the small diameter cylindrical portion 127 of the base nut 110 is configured to prevent the base nut 110 from being rotated by an axial load from the piston 18 to the push rod 137 and to make the reverse efficiency thereof be 0 or less, i.e., configured as a screw-fitting portion having large irreversibility. Further, with the first screw-fitting portion 140 of the push rod 137 and the base nut 110, the coil portion 135B of the first spring clutch 135 is wound in the thread groove at the other end side of the male threaded portion 138.

Meanwhile, a male threaded portion 139 is formed on the other end side of the push rod 137 so as to be screw-fitted into a female threaded portion 197 formed in a rotary-to-linear motion ramp 186 of the ball and ramp mechanism 162 (to be described later). Here, similarly, a second screw-fitting portion 141 between the male threaded portion 139 of the push rod 137 and the female threaded portion 197 formed in the rotary-to-linear motion ramp 186 is configured to prevent the push rod 137 from being rotated by the axial load from the piston 18 to the rotary-to-linear motion ramp 186 and to make the reverse efficiency thereof be 0 or less, i.e., configured as a screw-fitting portion having large irreversibility.

The push rod 137 is provided with a spline shaft 143 between the male threaded portion 138 on one end side and the male threaded portion 139 on the other end side. The outer diameter of the male threaded portion 138 on one end side is larger than the outer diameter of the male threaded portion 139 on the other end side. The outer diameter of the male threaded portion 138 on one end side is larger than the outer diameter of the spline shaft 143. A small diameter columnar portion 142 is continuously formed from the male threaded portion 139 of the push rod 137 to the other end side. The outer peripheral surface of the columnar portion 142 is knurled. A stopper member 207 is integrally fixed to the columnar portion 142 of the push rod 137 by press-fitting. The stopper member 207 determines the rotation range of the rotary-to-linear motion ramp 186 relative to the push rod 137. The other end surface of the columnar portion 142 of the push rod 137 faces the bottom portion 19 of the piston 18.

A retainer 145 is axially movably supported between the outer peripheral surface of the small diameter cylindrical portion 127 of the cylindrical portion 118 forming the nut portion 112 of the base nut 110 and the inner peripheral surface of the cylindrical portion 20 of the piston 18. The retainer 145 has an annular wall portion 146 on one end side, and is configured to have a substantially cylindrical shape as a whole. A plurality of through-holes 149 and 150 are formed in the outer peripheral wall of the retainer 145. A washer 155 on one end side, a coil spring 156, a washer 157 on the other end side, a support plate 158, a second spring clutch 159, a rotation member 160, a thrust bearing 161, the ball and ramp mechanism 162, a thrust bearing 163, and an annular pressing plate 164 are arranged in sequence from one end side inside the retainer 145. The washer 155 on one end side is arranged to come into contact with the other end surface of the annular wall portion 146 of the retainer 145.

The coil spring 156 is interposed between the washer 155 on one end side and the washer 157 on other end side. The coil spring 156 pushes the washer 155 on one end side and the washer 157 on the other end side so as to be separated from each other. A plurality of locking grooves 167 having a predetermined depth are formed at an interval in the circumferential direction in the other end surface of the circumferential wall portion of the retainer 145. Each locking groove 167 is continuously composed of a narrow locking groove 168 located on one end side and a wide locking groove 169 located on the other end side. The locking grooves 167 are formed at three locations in the present embodiment. A plurality of claw portions 171 are formed on the other end of the retainer 145 to face the bottom portion 19 of the piston 18. After the washer 155 on one end side, the coil spring 156, the washer 157 on the other end side, the support plate 158, the second spring clutch 159, the rotation member 160, the thrust bearing 161, the ball and ramp mechanism 162, the thrust bearing 163, and the annular pressing plate 164 are accommodated inside the retainer 145, each claw portion 171 of the retainer 145 is fitted toward an accommodating recess 206 in the annular pressing plate 164 (to be described later), so that the above-described several constituent members may be integrally arranged and assembled inside the retainer 145.

The annular support plate 158 is arranged so as to come into contact with the other end surface of the washer 157 on the other end side. A plurality of protruding pieces 172 are formed at an interval in the circumferential direction on the outer peripheral surface of the support plate 158. In the present embodiment, the protruding pieces 172 are formed at three locations. The respective protruding pieces 172 of the support plate 158 are fitted into the respective narrow locking grooves 168 of the retainer 145 and the respective rotation restricting vertical grooves 22 formed in the inner peripheral surface of the piston 18. As a result, the retainer 145 is supported, together with the washer 155 on one end side, the coil spring 156, the washer 157 on the other side, and the support plate 158 so as not to be rotatable and be axially movable relative to the piston 18.

The rotation member 160 is rotatably supported on the other end side of the support plate 158 inside the retainer 145. The rotation member 160 is composed of a large diameter annular portion 176 having a spline hole 175 and a small diameter cylindrical portion 177 integrally protruding from one end surface of the large diameter annular portion 176. One end of the small diameter cylindrical portion 177 comes into contact with the other end surface of the support plate 158. The push rod 137 is inserted through the rotation member 160, and the spline hole 175 in the large diameter annular portion 176 of the rotation member 160 and the spline shaft 143 of the push rod 137 are spline-coupled with each other. Thus, the rotation member 160 and the push rod 137 mutually transmit a rotational torque.

The second spring clutch 159 is wound around the outer peripheral surface of the small diameter cylindrical portion 177 of the rotation member 160 to impart rotational resistance against one-directional rotation. Similarly to the first spring clutch 135, the second spring clutch 159 is composed of a tip end 159A facing radially outward and a coil portion 159B as a continuous one turn from the tip end 159A. Then, the tip end 159A of the second spring clutch 159 is fitted into any one of the narrow locking grooves 168 of the retainer 145, and the coil portion 159B is wound around the outer peripheral surface of the small diameter cylindrical portion 177 of the rotation member 160. The second spring clutch 159 is configured to impart the rotational resistance torque against the rotation direction (rotation direction at the time of "applying") when the rotation member 160 (push rod 137) moves to the bottom portion 19 side of the piston 18 relative to the retainer 145, but allow rotation in the rotation direction (rotation direction at the time of "releasing") when the rotation member 160 moves to the bottom wall 11 side of the cylinder 15.

The rotational resistance torque at the time of "applying" of the second spring clutch 159 is set to be larger than the rotational resistance torque of the first screw-fitting portion 140 between the male threaded portion 138 of the push rod 137 and the female threaded portion 132 of the base nut 110. The ball and ramp mechanism 162 is arranged on the other end side of the rotation member 160 via the thrust bearing 161. The rotation member 160 is rotatably supported on the ball and ramp mechanism 162 via the thrust bearing 161.

The ball and ramp mechanism 162 includes a fixed ramp 185, the rotary-to-linear motion ramp 186, and balls 187 interposed and mounted between the fixed ramp 185 and the rotary-to-linear motion ramp 186. The fixed lamp 185 is arranged on the other end side of the rotation member 160 via the thrust bearing 161. The fixed lamp 185 is composed of a disc-shaped fixed plate 189 and a plurality of projections 190 protruding from the outer peripheral surface of the fixed plate 189 at an interval in the circumferential direction. In the present embodiment, the projections 190 are formed at three locations. An insertion through-hole 191 into which the push rod 137 is inserted is formed in the radial center of the fixed plate 189. The fixed lamp 185 is supported so as not to be rotatable and be axially movable relative to the piston 18 as the respective projections 190 are fitted into the respective wide locking grooves 169 of the retainer 145 and are fitted into the respective rotation restricting vertical grooves 22 formed in the inner peripheral surface of the piston 18. A plurality of (three in the present embodiment) ball grooves 192 are formed in the other end surface of the fixed plate 189 to extend in an arc shape with a predetermined inclination angle in the circumferential direction and to have an arc-shaped cross section in the radial direction.

The rotary-to-linear motion lamp 186 is composed of an annular rotary-to-linear motion plate 195 and a cylindrical portion 196 integrally protruding from a radial central portion of the other end surface of the rotary-to-linear motion plate 195. The female threaded portion 197 into which the male threaded portion 139 of the push rod 137 is screw-fitted is formed in the inner peripheral surface from the rotary-to-linear motion plate 195 to the cylindrical portion 196. A plurality of (three in the embodiment) ball grooves 198 are formed in the surface of the rotary-to-linear motion plate 195 facing the fixed plate 189 of the fixed ramp 185 to extend in an arch shape with a predetermined inclination angle in the circumferential direction and to have an arc-shaped cross section in the radial direction. Each ball groove 192 of the fixed ramp 185 and each ball groove 198 of the rotary-to-linear motion ramp 186 may be configured by adding a recess in the middle of a slope along the circumferential direction or by changing the inclination angle.

The balls 187 are respectively interposed and mounted between the respective ball grooves 198 of the rotary-to-linear motion ramp 186 (rotary-to-linear motion plate 195) and the respective ball grooves 192 of the fixed ramp 185 (fixed plate 189). Then, when a rotational torque is applied to the rotary-to-linear motion lamp 186, the respective balls 187 between the ball grooves 198 of the rotary-to-linear motion plate 195 and the ball grooves 192 of the fixed plate 189 perform a rolling motion, whereby the relative axial distance between the rotary-to-linear motion plate 195 and the fixed plate 189 is changed by a rotational difference between the rotary-to-linear motion plate 195 and the fixed plate 189.

The annular pressing plate 164 is arranged on the other end surface of the rotary-to-linear motion plate 195 around the cylindrical portion 196 via the thrust bearing 163. A plurality of projections 203 protrude from the outer peripheral surface of the annular pressing plate 164 at an interval in the circumferential direction. In the present embodiment, the projections 203 are formed at three locations. The annular pressing plate 164 is supported so as not to be rotatable and be axially movable relative to the piston 18 as the respective projections 203 are fitted into the respective wide locking grooves 169 of the retainer 145 and are fitted into the respective rotation restricting vertical grooves 22 formed in the inner peripheral surface of the piston 18.

The rotary-to-linear motion ramp 186 of the ball and ramp mechanism 162 is rotatably supported by the annular pressing plate 164 via the thrust bearing 163. The other end surface of the annular pressing plate 164 comes into contact with the bottom portion 19 of the piston 18 to press the piston 18. Accommodating recesses 206 are formed respectively in the outer peripheral portion between the respective projections 203 on the other end surface of the annular pressing plate 164 to accommodate therein the respective claw portions 171 of the retainer 145 that are folded inward.

Moreover, as illustrated in FIG. 1, an ECU 210 configured with an electronic control device that controls driving of the motor 39 is electrically connected to the motor 39. The ECU 210 is electrically connected to a parking switch 211 which is operated to instruct the activation/release of a parking brake. Further, the ECU 210 may also operate based on a signal from the vehicle side (not illustrated) without operating the parking switch 211.

Next, an operation of the disc brake 1*a* according to the first embodiment will be described.

First, an operation at the time of braking of the disc brake 1*a* as a normal hydraulic brake by operation of a brake pedal (not illustrated) will be described.

When a driver depresses the brake pedal, a hydraulic pressure corresponding to the pedaling force of the brake pedal is supplied from a master cylinder to the hydraulic chamber 21 inside the caliper 4 by way of a hydraulic circuit (not illustrated). Thus, the piston 18 moves forward (moves leftward in FIG. 1) from the original position thereof at the time of non-braking while elastically deforming the piston seal 16, thereby pushing the inner brake pad 2 against the disc rotor D. Then, the caliper body 6 moves rightward in FIG. 1 relative to the bracket 5 by the reaction force of the pressing force of the piston 18, thereby pushing the outer brake pad 3 mounted to the claw portion 8 against the disc rotor D. As a result, the disc rotor D is sandwiched between the pair of inner and outer brake pads 2 and 3 to generate a frictional force, which in turn results in generation of a vehicle braking force.

Then, when the driver releases the brake pedal, the supply of hydraulic pressure from the master cylinder is interrupted, and the hydraulic pressure in the hydraulic chamber 21 drops. Thus, the piston 18 retracts to the original position thereof by the restoration force of elastic deformation of the piston seal 16, and the braking force is removed. Incidentally, when the amount of movement of the piston 18 increases due to wear of the inner and outer brake pads 2 and 3 and exceeds the limit of elastic deformation of the piston seal 16, slippage occurs between the piston 18 and the piston seal 16. By this slippage, the original position of the piston 18 with respect to the caliper body 6 is moved to constantly adjust the clearance between the pads.

Next, an operation as a parking brake which is an example of an operation for keeping the stop state of the vehicle will be described.

First, when the parking switch 211 is operated to operate (apply) the parking brake in the released state of the parking brake, the ECU 210 drives the motor 39 to rotate the rotation shaft 40 thereof and rotate the reduction gear 47 and the non-reduction spur gear 48 of the spur gear multi-stage reduction mechanism 44. The rotation of the spur gear multi-stage reduction mechanism 44 causes the output gear portion 58 of the planetary gear reduction mechanism 45 to rotate. By the rotation of the output gear portion 58, each planetary gear 60 revolves around the output gear portion 58 while rotating about the own axis thereof, so that the carrier 97 rotates. Then, the rotational torque from the carrier 97 is transmitted to the base nut 110.

At this time, since the sun gear 59 of the planetary gear reduction mechanism 45 is rotatably supported on the cylindrical support portion 85 of the internal gear 61, and since the axis of the sun gear 59 and the axis of the internal gear 61 are arranged substantially concentrically, meshing between the sun gear 59 and each planetary gear 60 and meshing between each planetary gear 60 and the internal gear 61 are stabilized, which may allow rotation from the spur gear multi-stage reduction mechanism 44 to be smoothly transmitted to the carrier 97.

Subsequently, the rotational resistance torque in the "applying" direction of the rotation member 160 (push rod 137) against the retainer 145 (piston 18) by the second spring clutch 159 is set to be larger than the rotational resistance torque by the first screw-fitting portion 140 between the push rod 137 and the base nut 110. Thus, the push rod 137 is allowed to rotate in the "applying" direction relative to the base nut 110 by the first spring clutch 135. Therefore, by the rotation of the base nut 110 in the "applying" direction, the first screw-fitting portion 140 relatively rotates, i.e., only the base nut 110 rotates in the "applying" direction, whereas the push rod 137 axially moves forward toward the bottom portion 19 side of the piston 18.

As a result, the respective constituent members inside the retainer 145, such as the washer 155 on one end side, the coil spring 156, the washer 157 on the other end side, the support plate 158, the second spring clutch 159, the rotation member 160, the thrust bearing 161, the ball and ramp mechanism 162, the thrust bearing 163 and the annular pressing plate 164, as well as the retainer 145 integrally axially move forward, along with the push rod 137, toward the bottom portion 19 side of the piston 18. By the forward movement of these components, the annular pressing plate 164 is brought into contact with the bottom portion 19 of the piston 18 and the piston 18 moves forward so that one end surface of the bottom portion 19 of the piston 18 is brought into contact with the inner brake pad 2.

When the rotational driving of the motor 39 is further continued in the "applying" direction, the piston 18 starts to press the disc rotor D via the inner and outer brake pads 2 and 3 by the movement of the push rod 137. When this pressing force starts to be generated, the rotational resistance torque in the first screw-fitting portion 140 between the push rod 137 and the base nut 110 is increased by an axial force that is the reaction force of the pressing force, becoming larger than the rotational resistance torque of the second spring clutch 159. As a result, with rotation of the base nut 110, the push rod 137 starts to rotate in the "applying" direction along with the rotation member 160. Then, the rotational resistance torque in the second screw-fitting portion 141 between the push rod 137 and the ball and ramp mechanism 162 is also increased by the reaction force of the pressing force to the disc rotor D. Therefore, the rotational torque of the push rod 137 in the "applying" direction is transmitted to the rotary-to-linear motion ramp 186 of the ball and ramp mechanism 162 via the second screw-fitting portion 141.

At this time, the rotational torque of the push rod 137 in the "applying" direction is transmitted to the rotary-to-linear motion ramp 186 of the ball and ramp mechanism 162 while generating a relative rotational difference in the second screw-fitting portion 141 (causing the rotary-to-linear motion ramp 186 to rotate slightly later than the push rod 137). Then, the respective balls 187 perform a rolling motion while the rotary-to-linear motion ramp 186 of the ball and ramp mechanism 162 rotating in the "applying" direction, so that the rotary-to-linear motion ramp 186 and the fixed lamp 185 are separated from each other against the pushing force of the coil spring 156, which causes the annular pressing plate 164 to further press the bottom portion 19 of the piston 18. Thus, the pressing force to the disc rotor D by the inner and outer brake pads 2 and 3 increases.

In the disc brake 1*a* according to the present embodiment, first, by relative rotation of the first screw-fitting portion 140 between the push rod 137 and the base nut 110, the push rod 137 moves forward to move the piston 18 forward, obtaining the pressing force to the disc rotor D. Therefore, by the operation of the first screw-fitting portion 140, the original position of the push rod 137 may be adjusted with respect to the piston 18 which is changed due to wear of the inner and outer brake pads 2 and 3 over time.

Then, the ECU 210 drives the motor 39 until the pressing force from the pair of inner and outer brake pads 2 and 3 to the disc rotor D reaches a predetermined value, e.g., until the current value of the motor 39 reaches a predetermined value. Thereafter, when detecting that the pressing force to the disc rotor D has reached the predetermined value by detecting that the current value of the motor 39 has reached the predetermined value, the ECU 210 stops energizing the motor 39. Then, the linear motion of the ball and ramp mechanism 162 due to the rotation of the rotary-to-linear motion ramp 186 is stopped.

Finally, the reaction force of the pressing force from the disc rotor D acts on the rotary-to-linear motion ramp 186, but the second screw-fitting portion 141 between the push rod 137 and the ball and ramp mechanism 162 is configured as a screw-fitting portion that does not operate in reverse, and further, the first screw-fitting portion 140 between the push rod 137 and the base nut 110 is also configured as a screw-fitting portion that does not operate in reverse, and furthermore, the rotational resistance torque in the "releasing" direction with respect to the base nut 110 is imparted to the push rod 137 by the first spring clutch 135, so that the piston 18 is held at the braking position. Thus, the braking force is retained, and the operation of the parking brake is completed.

Next, when releasing the parking brake (at the time of releasing), the ECU 210 rotationally drives the motor 39 in the "releasing" direction in which the piston 18 is separated from the disc rotor D based on a parking release operation of the parking switch 211. Thus, the spur gear multi-stage reduction mechanism 44 and the planetary gear reduction mechanism 45 rotate in the "releasing" direction to return the piston 18, and the rotation in the "releasing" direction is transmitted to the base nut 110 via the carrier 97.

At this time, the reaction force of the pressing force from the disc rotor D acts on the push rod 137. In other words, the rotational resistance torque of the second screw-fitting portion 141 between the push rod 137 and the ball and ramp mechanism 162, the rotational resistance torque of the first screw-fitting portion 140 between the push rod 137 and the base nut 110, and the rotational resistance torque in the "releasing" direction against the base nut 110 of the push rod 137 by the first spring clutch 135 act on the push rod 137. Therefore, the rotational torque in the "releasing" direction from the base nut 110 is transmitted to the push rod 137 (including the rotation member 160) and also to the rotary-to-linear motion ramp 186 of the ball and ramp mechanism 162. As a result, the rotary-to-linear motion lamp 186 rotates only in the "releasing" direction and returns to the initial position thereof in the rotation direction.

Next, the reaction force to the push rod 137 is reduced, so that the rotational resistance torque of the second screw-fitting portion 141 between the push rod 137 and the ball and ramp mechanism 162 becomes smaller than the sum of the rotational resistance torque of the push rod 137 in the "releasing" direction with respect to the base nut 110 by the first spring clutch 135 and the rotational resistance torque of the first screw-fitting portion 140 between the push rod 137 and the base nut 110, which makes it impossible for the rotary-to-linear motion ramp 186 rotate in the "releasing" direction. Therefore, only the second screw-fitting portion 141 relatively rotates, and the rotary-to-linear motion ramp 186 of the ball and ramp mechanism 162 axially moves, along with the retainer 145, to the bottom wall 11 side of the cylinder 15 (in the "releasing" direction) and returns to the initial position thereof in the axial direction.

Furthermore, when the motor 39 is rotationally driven in the "releasing" direction and the rotation of the base nut 110 in the "releasing" direction is continued, the rotary-to-linear motion lamp 186 of the ball and ramp mechanism 162 returns to the initial position thereof in the axial direction, and the second screw-fitting portion 141 between the push rod 137 and the ball and ramp mechanism 162 returns to the initial screw-fitting position, so that the rotation of the push rod 137 in the "releasing" direction is stopped.

When the rotation of the base nut 110 in the "releasing" direction is further continued, the push rod 137 resists the rotational resistance torque of the push rod 137 in the "releasing" direction with respect to the base nut 110 by the first spring clutch 135, thereby axially retracting toward the bottom wall 11 side of the cylinder 15 (in the "releasing" direction). As a result, the respective constituent members inside the retainer 145, such as the washer 155 on one end side, the coil spring 156, the washer 157 on the other end side, the support plate 158, the second spring clutch 159, the rotation member 160, the thrust bearing 161, the ball and ramp mechanism 162, the thrust bearing 163 and the annular pressing plate 164, as well as the retainer 145 integrally axially retract, along with the push rod 137, toward the bottom wall 19 side of the cylinder 15 (in the "releasing" direction). Then, the piston 18 retracts to the original position thereof by the restoration force of elastic deformation of the piston seal 16, and the braking force is completely removed.

As described above, in the disc brake 1*a* according to the first embodiment, relative movement of the internal gear 61 with respect to the housing 30 in the axial direction and the radial direction is restricted, and the internal gear 61 is also supported so as not to be rotatable relative to the housing 30, and the sun gear 59 is rotatably supported on the cylindrical support portion 85 of the internal gear 61. Thus, when the planetary gear reduction mechanism 45 is assembled, the axis of the sun gear 59 and the axis of the internal gear 61 may be arranged substantially concentrically. As a result, meshing between the sun gear 59 and each planetary gear 60 and meshing between each planetary gear 60 and the internal gear 61 is stabilized, which may ensure wear durability and thus improved reliability. Moreover, it may be not necessary to excessively improve the shape accuracy of the sun gear 59, each planetary gear 60, and the internal gear 61 and the assembling accuracy of the sun gear 59, each planetary gear 60, and the internal gear 61, which may result in cost satisfaction.

In short, as compared with the related art in which the sun gear is rotatably supported by the shaft which is pivotally supported on the cover (cover which closes the opening in the housing to be described later), whereas the internal gear is supported so as not to be rotatable relative to the housing, or as compared with the related art in which the sun gear is rotatably supported on one region of the housing, whereas the internal gear is supported so as not to be rotatable relative to the housing, in the disc brake 1a according to the first embodiment, the axis of the sun gear 59 and the axis of the internal gear 61 may be arranged substantially concentrically, which may exert the above-described effects.

Further, in the disc brake 1a according to the first embodiment, since the annular surface 88 extending along the axial direction of the sun gear 59 is formed on the cylindrical support portion 85 of the internal gear 61, the sun gear 59 may be rotatably supported along the annular surface 88, which may simplify the structure of the sun gear.

Furthermore, in the disc brake 1a according to the first embodiment, the internal gear 61 includes the internal gear portion 83 having the inner teeth 82 meshing with the gear portions 78 of the plurality of planetary gears 60 and the annular wall portion 84 extending from the axial end of the internal gear portion 83 toward the radial center side to restrict the axial movement of each planetary gear 60, and the cylindrical support portion 85 axially extends in a tubular shape from the inner peripheral side end of the annular wall portion 84. Thus, the cylindrical support portion 85 may be easily formed, which may suppress manufacturing costs.

Furthermore, in the disc brake 1a according to the first embodiment, the sun gear 59 is provided with the boss portion 57 which extends axially within a range from the radial central region of the input gear portion 56 to the output gear portion 58. Then, the cylindrical support portion 85 of the internal gear 61 is arranged radially outside the boss portion 57 of the sun gear 59, so that the boss portion 57 of the sun gear 59 is rotatably supported on the cylindrical support portion 85 of the internal gear 61. Thus, since the sun gear 59 is rotatably supported with respect to the internal gear 61 near the radial center of the internal gear 61 and the sun gear 59, the sliding area of the two 57 and 85 may be reduced to suppress sliding resistance, which may ensure smooth relative rotation thereof.

Next, a disc brake 1b according to a second embodiment will be described with reference to FIGS. 9 to 13. When describing the disc brake 1b according to the second embodiment, only differences from the disc brake 1a according to the first embodiment will be described.

As illustrated in FIGS. 9 to 12, in the disc brake 1b according to the second embodiment, a sun gear 225 has the input gear portion 56 meshing with the non-reduction spur gear 48 of the spur gear multi-stage reduction mechanism 44 to which rotation from the motor 39 is transmitted, a columnar portion 230 integrally extending axially from the radial central region of the input gear portion 56 toward the other end side, and the output gear portion 58 integrally extending axially from the columnar portion 230 toward the other end side. The outer diameter of the columnar portion 230 is equal to the outer diameter of the output gear portion 58. The input gear portion 56 and the columnar portion 230 are integrally connected to each other by an annular wall portion 231. The annular wall portion 231 has the outer annular wall portion 67 having the outer peripheral surface connected to the substantially axial central portion of the inner peripheral surface of the input gear portion 56, the inner annular wall portion 68 having the inner peripheral surface connected to one axial end of the columnar portion 230, and a cylindrical wall portion 232 connected to the inner peripheral surface of the outer annular wall portion 67 and the outer peripheral surface of the inner annular wall portion 68 to extend axially. The cylindrical wall portion 232 of the annular wall portion 231 of the sun gear 225 corresponds to a cylindrical stepped portion.

Figure 10:
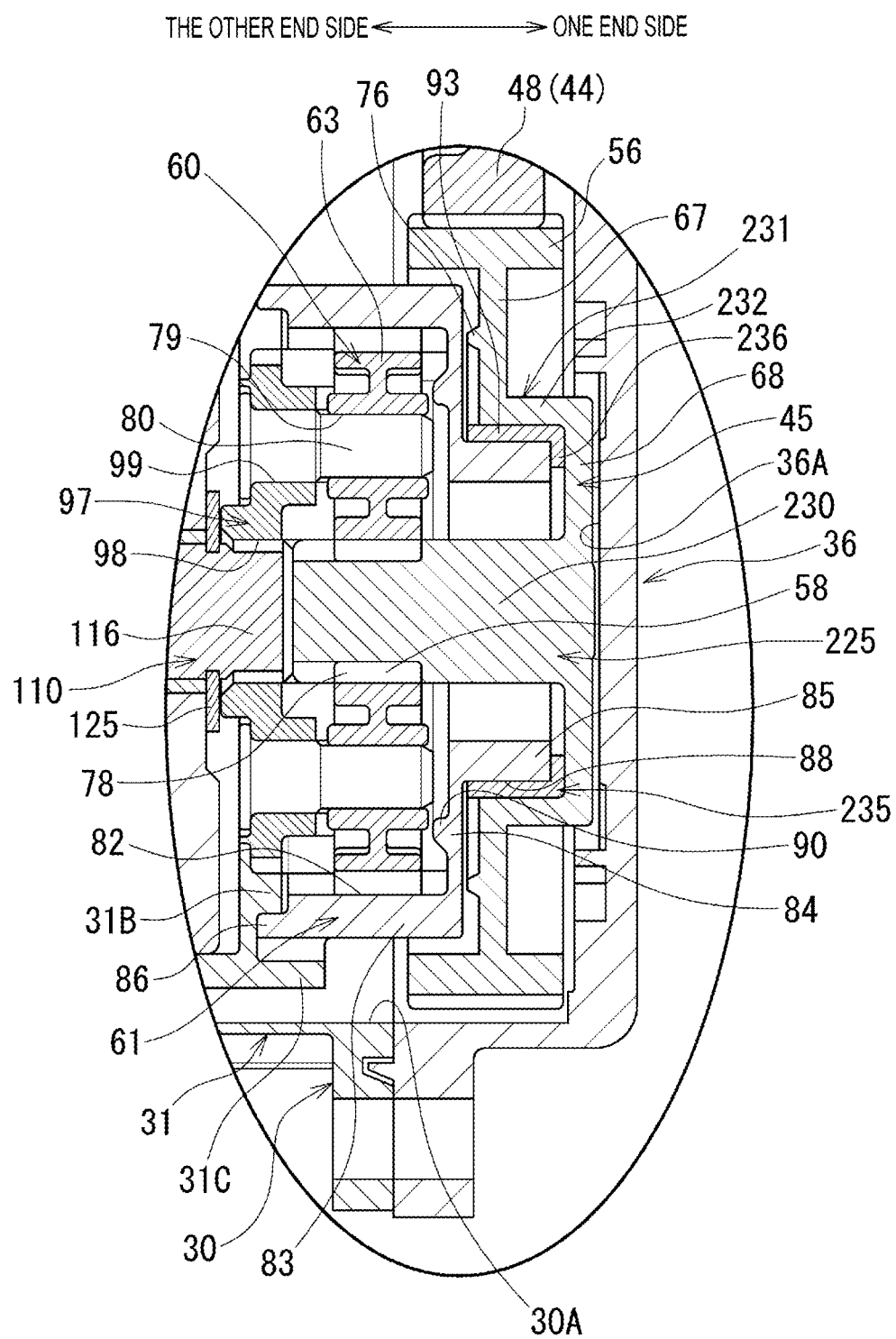
FIG. 10 is an enlarged view of a major part of FIG. 9.
Figure 11:
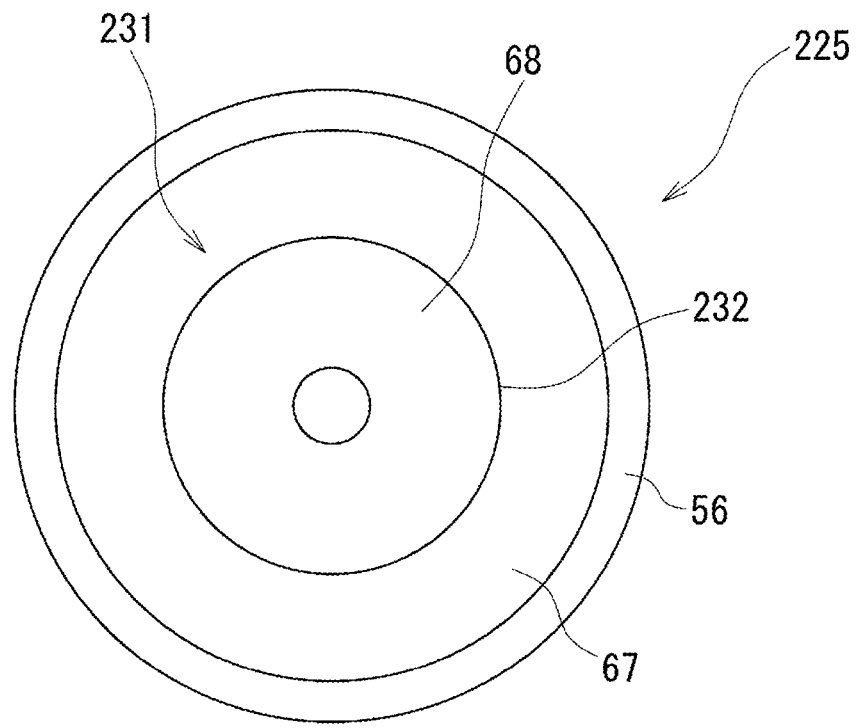
FIG. 11 is a plan view of a sun gear employed in the disc brake of FIG. 9.
Figure 12:
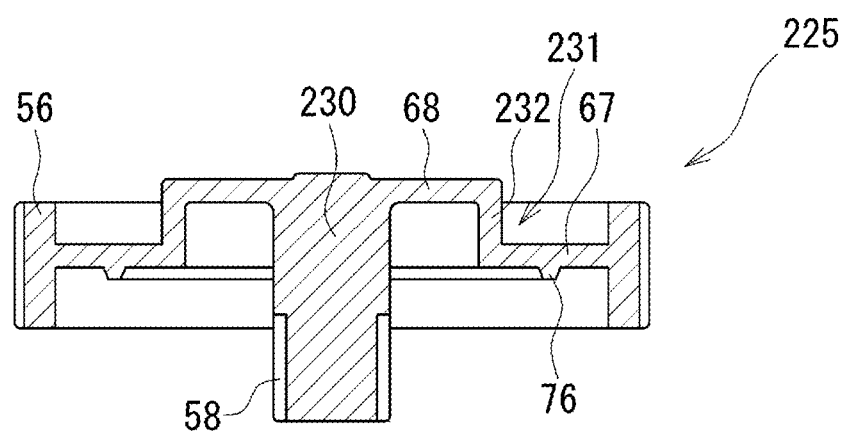
FIG. 12 is a cross-sectional view of the sun gear of FIG. 11.
Figure 13:
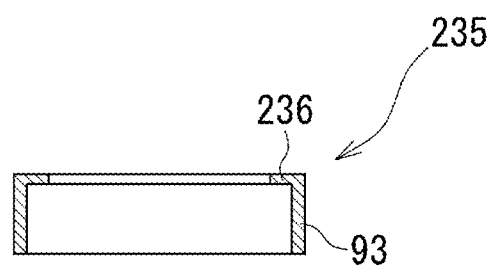
FIG. 13 is a cross-sectional view of a bush employed in the disc brake of FIG. 9.

Then, as illustrated in FIG. 10, the cylindrical support portion 85 of the internal gear 61 is arranged radially inside the cylindrical wall portion 232 of the annular wall portion 231 of the sun gear 225 so as to face each other, and a bush 235 is arranged between the cylindrical wall portion 232 of the annular wall portion 231 of the sun gear 225 and the cylindrical support portion 85 of the internal gear 61. As illustrated in FIGS. 10 and 13, the bush 235 includes the cylindrical portion 93 arranged between the cylindrical wall portion 232 of the annular wall portion 231 of the sun gear 225 and the cylindrical support portion 85 of the internal gear 61 and an annular extending wall portion 236 extending inwardly from one axial end of the cylindrical portion 93. The inner diameter of the inner extending wall portion 236 is slightly larger than the inner diameter of the cylindrical support portion 85 of the internal gear 61.

The cylindrical portion 93 of the bush 235 comes into contact with the inner peripheral surface of the cylindrical wall portion 232 of the sun gear 225, and comes into contact with the outer peripheral surface (annular surface 88) of the cylindrical support portion 85 of the internal gear 61. The inner extending wall portion 236 of the bush 235 comes into contact with one end surface of the cylindrical support portion 85 of the internal gear 61 and comes into contact with the other end surface of the inner annular wall portion 68 of the sun gear 225. With this configuration, the cylindrical wall portion 232 of the annular wall portion 231 of the sun gear 225 is rotatably supported on the cylindrical support portion 85 of the internal gear 61 via the bush 235. The bush 235 may be integrally molded with the cylindrical wall portion 232 of the sun gear 225, or may be integrally molded with the cylindrical support portion 85 of the internal gear 61.

As described above, also in the disc brake 1b according to the second embodiment, the cylindrical support portion 85 of the internal gear 61 is arranged radially inside the cylindrical wall portion 232 of the annular wall portion 231 of the sun gear 225, and the cylindrical wall portion 232 of the annular wall portion 231 of the sun gear 225 is rotatably supported on the cylindrical support portion 85 of the internal gear 61. Thus, similar to the disc brake 1a according to the first embodiment, when the planetary gear reduction mechanism 45 is assembled, the axis of the sun gear 225 and the axis of the internal gear 61 may be arranged substantially concentrically, which may consequently ensure wear durability of the sun gear 225, each planetary gear 60, and the internal gear 61 and thus improved reliability. Then, it may be not necessary to excessively improve the shape accuracy of the sun gear 225, each planetary gear 60, and the internal gear 61 and the assembling accuracy of the sun gear 225, each planetary gear 60, and the internal gear 61, which is satisfactory costly.

In the disc brakes 1a and 1b according to the first and second embodiments, the sun gear 59; 225 is rotatably supported on the cylindrical support portion 85 of the internal gear 61, but the sun gear 59; 225 may be rotatably supported on one end of the internal gear portion 83 of the internal gear 61. That is, although not illustrated, a bush may be arranged between the inner peripheral surface of the input gear portion 56 of the sun gear 59; 225 from the outer annular wall portion 67 to the other end side and the outer peripheral surface of one end of the internal gear portion 83 of the internal gear 61, and in this region, the sun gear 59; 225 may be rotatably supported with respect to the internal gear 61. In a case of this embodiment, one end of the internal gear portion 83 of the internal gear 61 functions as a tubular support portion.

Next, a disc brake 1c according to a third embodiment will be described with reference to FIGS. 14 to 16. When describing the disc brake 1c according to the third embodiment, only differences from the disc brake 1a according to the first embodiment will be described.

Figure 14:
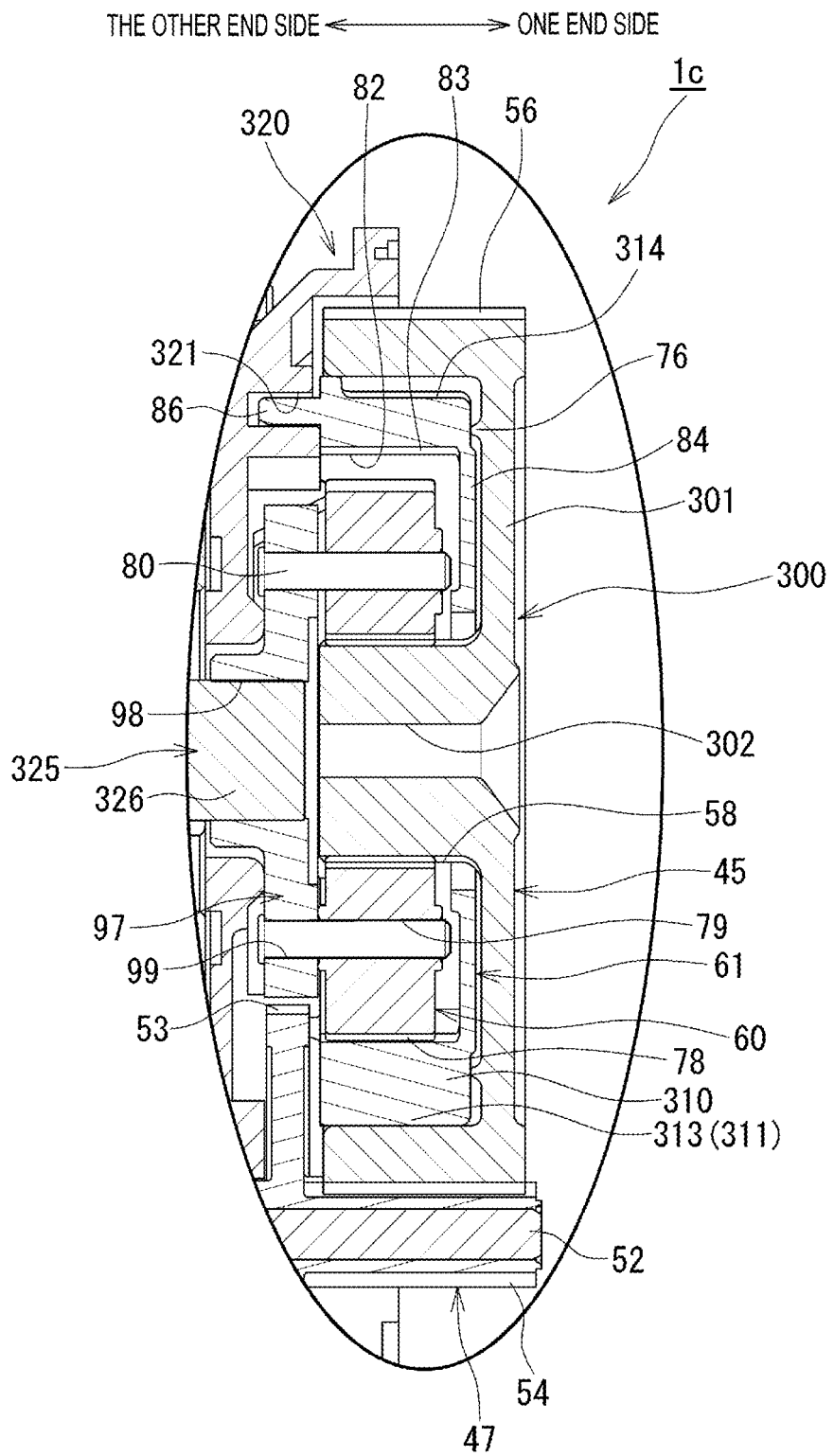
FIG. 14 is a cross-sectional view of a major part of a disc brake according to a third embodiment.
Figure 15:
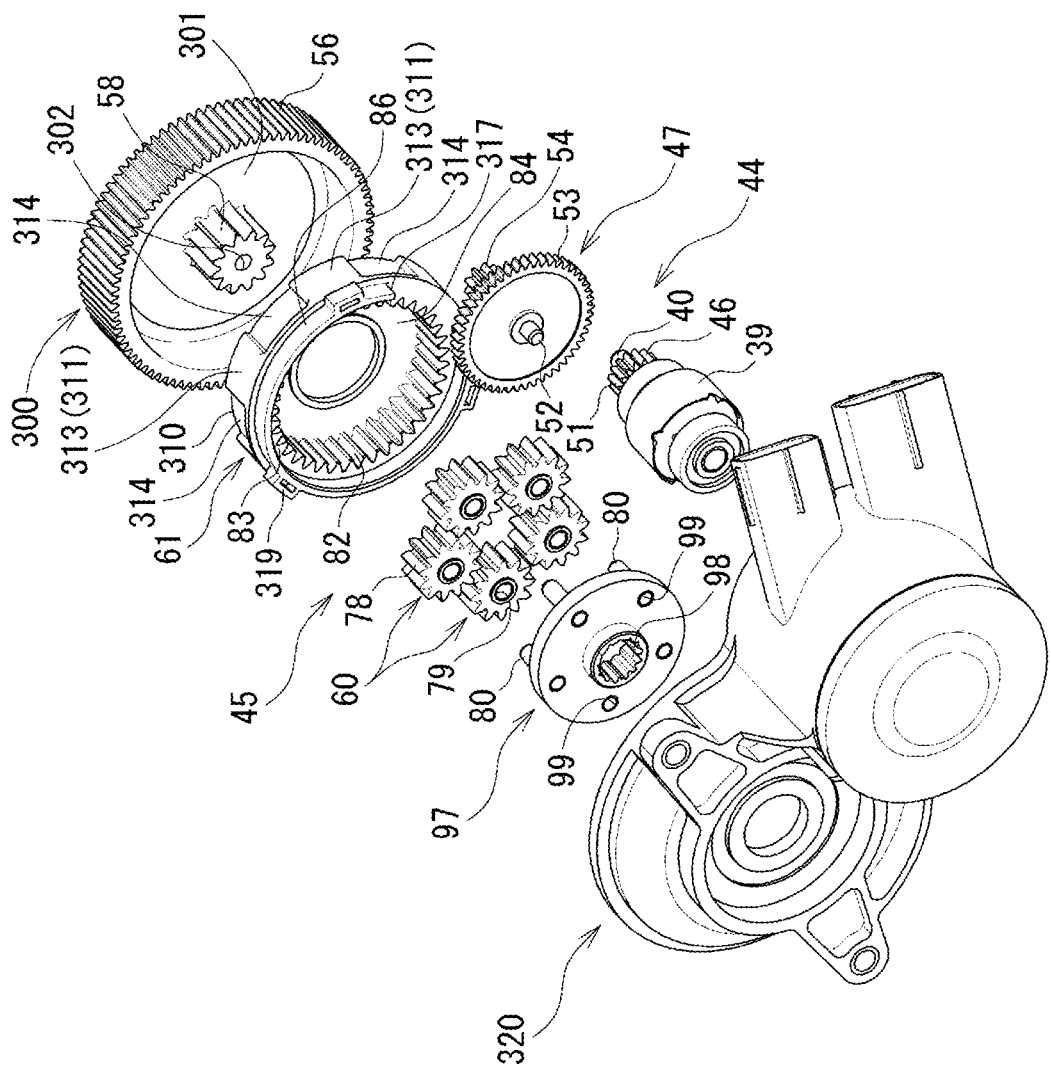
FIG. 15 is an exploded perspective view of a speed reduction mechanism employed in the disc brake of FIG. 14.

In the disc brake 1c according to the third embodiment, as illustrated in FIGS. 14 and 15, the spur gear multi-stage reduction mechanism 44 includes the pinion gear 46 and the reduction gear 47. The pinion gear 46 is fixedly press-fitted into the rotation shaft 40 of the motor 39. The reduction gear 47 is integrally composed of the large gear portion 53 having a large diameter to mesh with the gear portion 51 of the pinion gear 46 and the small gear portion 54 having a small diameter to extend axially from a radial central portion of the large gear portion 53 toward one end side.

The small gear portion 54 of the reduction gear 47 meshes with the planetary gear reduction mechanism 45. The planetary gear reduction mechanism 45 includes a sun gear 300, the plurality of (five in FIG. 15) planetary gears 60, the internal gear 61, and the carrier 97. The small gear portion 54 of the reduction gear 47 meshes with the sun gear 300. The sun gear 300 includes the cylindrical input gear portion 56 meshing with the small gear portion 54 of the reduction gear 47, the output gear portion 58 integrally extending axially from the radial central region of the input gear portion 56 toward the other end side, and an annular wall portion 301 integrally connecting the input gear portion 56 and the output gear portion 58 to each other at one end thereof. The other end surface of the input gear portion 56 and the other end surface of the output gear portion 58 are located on substantially the same plane. The stopper 76 (see FIG. 14) extends annularly on the other end surface of the annular wall portion 301 to protrude to the other end side. A through-hole 302 is formed axially in the radial center of the sun gear 300.

Figure 16:
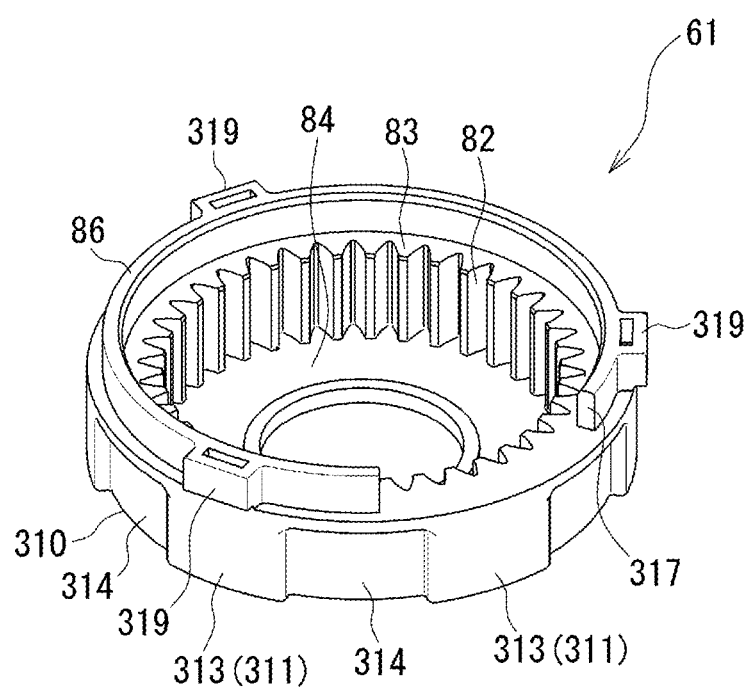
FIG. 16 is a perspective view of an internal gear which is a component of the speed reduction mechanism of FIG. 15.

Referring to FIG. 16, the internal gear 61 is formed to have a tubular shape as a whole and is arranged inside the input gear portion 56 of the sun gear 300 to mesh with each planetary gear 60 and surround the planetary gear 60. Specifically, the internal gear 61 includes the internal gear portion 83 having a cylindrical wall portion 310 and the inner teeth 82 formed on the inner peripheral surface of the cylindrical wall portion 310 to mesh with the respective gear portions 78 of the planetary gears 60, the annular wall portion 84 integrally extending from one end of the internal gear portion 83 toward the radial center side to restrict axial movement of each planetary gear 60, and the cylindrical engaging portion 86 integrally extending in a tubular shape toward the other end side from the other end side end of the internal gear portion 83. Recesses 314 and a support portion 311 are formed on the outer peripheral surface of the cylindrical wall portion 310.

The support portion 311 is configured with a plurality of projections 313 which are provided at an interval in the circumferential direction so as to protrude radially outward from the outer peripheral surface of the cylindrical wall portion 310. These projections 313 have a substantially rectangular shape in a front view. Each projection 313 is formed within a range from one end to the other end of the cylindrical wall portion 310. The curvature of the outer peripheral surface of each projection 313 is the same as the curvature of the inner peripheral surface of the input gear portion 56 of the sun gear 300. The respective projections 313 rotatably support the inner peripheral surface of the input gear portion 56 of the sun gear 300 from the inside. The recesses 314 having a substantially rectangular shape in a front view are formed between the respective projections 313 and 313. As can be seen from FIG. 14, each recess 314 is formed from one end to immediately before the other end of the cylindrical wall portion 310. With the respective recesses 314, a sufficient amount of lubricant (e.g., grease) may fill between the respective projections 313 of the cylindrical wall portion 310 of the internal gear 61 and the inner peripheral surface of the input gear portion 56 of the sun gear 300, and moreover, easy discharge of abrasive powder and improved durability may be ensured. The other end of the cylindrical wall portion 310 of the internal gear 61 and the other ends of the input gear portion 56 and the output gear portion 58 of the sun gear 300 are located on substantially the same plane.

The cylindrical engaging portion 86 of the internal gear 61 is formed with a cutout portion 317 (see FIG. 15) in order to avoid interference with the large gear portion 53 of the reduction gear 47. A plurality of convex portions 319 are formed at an interval in the circumferential direction to protrude radially outward from the outer peripheral surface of the cylindrical engaging portion 86. Then, the cylindrical engaging portion 86 of the internal gear 61 is arranged in an annular groove 321 of a housing 320, and the convex portions 319 are engaged with plurality of engaging recesses (not illustrated) formed at an interval in the circumferential direction in the inner wall surface of the annular groove 321 of the housing 320. As a result, the radial movement of the internal gear 61 with respect to the housing 320 is restricted, and the internal gear 61 is supported so as not to be rotatable relative to the housing 320. Further, the internal gear 61 is restricted in axial movement relative to the housing 320 as one end surface of the annular wall portion 84 thereof comes into contact with the stopper 76 formed on the annular wall portion 301 of the sun gear 300. Meanwhile, as described above, the sun gear 300 is rotatably supported with respect to the internal gear 61 by each projection 313 (support portion 311) formed on the cylindrical wall portion 310 of the internal gear 61.

The carrier 97 is formed to have a disc shape and has the spline hole 98 formed substantially at the radial center thereof. The plurality of pin holes 99 are formed in the carrier 97 at an interval in the circumferential direction. The pins 80 are fixedly press-fitted into the respective pin holes 99. Each pin 80 protrudes from the carrier 97 to one end side. The pin 80 is rotatably inserted through the bore 79 of each planetary gear 60. Then, by fitting a spline shaft portion 326 of a rotation input shaft 325 of the rotary-to-linear motion conversion mechanism 43 into the spline hole 98 of the carrier 97, the carrier 97 and the rotation input shaft 325 of the rotary-to-linear motion conversion mechanism 43 may mutually transmit a rotational torque.

As described above, in the disc brake 1c according to the third embodiment, the sun gear 300 is rotatably supported by the respective projections 313 (support portion 311) formed on the outer peripheral surface of the cylindrical wall portion 310 of the internal gear 61. Thus, similar to the disc brakes 1a and 1b according to the first and second embodiments, when the planetary gear reduction mechanism 45 is assembled, the axis of the sun gear 300 and the axis of the internal gear 61 may be arranged substantially concentrically. As a result, meshing between the sun gear 300 and each planetary gear 60 and meshing between each planetary gear 60 and the internal gear 61 are stabilized, which may ensure wear durability and thus improved reliability.

Further, in the disc brake 1c according to the third embodiment, the entire internal gear 61 is arranged inside the input gear portion 56 of the sun gear 300, and the projections 313 (support portion 311) formed on the outer peripheral surface of the cylindrical wall portion 310 of the internal gear 61 rotatably support the inner peripheral surface of the input gear portion 56 from the inside of the sun gear 300. As a result, the axial length of the disc brake 1c may be made shorter than that of the disc brakes 1a and 1b according to the first and second embodiments, which may improve mountability on the vehicle.

Furthermore, since the curvature of the outer peripheral surface of each projection 313 (support portion 311) formed on the outer peripheral surface of the cylindrical wall portion 310 of the internal gear 61 employed in the disc brake 1c according to the third embodiment is larger than the curvature of the inner peripheral surface of the cylindrical support portion 85 of the internal gear 61 employed in the disc brake 1a according to the first embodiment, the projection 313 employed in the disc brake 1c according to the third embodiment achieves improved wear resistance due to a reduced surface pressure thereof.

Furthermore, in the disc brake 1c according to the third embodiment, since the recesses 314 are formed between the projections 313 and 313 formed on the outer peripheral surface of the cylindrical wall portion 310 of the internal gear 61, the lubricant inside the respective recesses 314 is appropriately supplied between the respective projections 313 of the cylindrical wall portion 310 of the internal gear 61 and the inner peripheral surface of the input gear portion 56 of the sun gear 300, which may reduce sliding resistance and improve wear resistance. Moreover, the respective recesses 314 formed in the outer peripheral surface of the cylindrical wall portion 310 of the internal gear 61 ensure easy discharge of abrasive powder and further improved wear resistance of the respective projections 313 of the cylindrical wall portion 310 of the internal gear 61.

Further, a configuration in which the planetary gear reduction mechanism 45 is employed in the disc brakes 1a, 1b and 1c has been described above, but the planetary gear reduction mechanism 45 may be employed as a planetary gear reduction mechanism for use in other devices to decelerate and boost rotation from a motor.

The above-described embodiments are employed in the disc brakes 1a, 1b, and 1c in which, at the time of braking during normal traveling, the piston 18 is moved forward by a brake hydraulic pressure supplied into the cylinder 15 of the caliper body 6 so that the disc rotor D is sandwiched between the pair of inner and outer brake pads 2 and 3 to generate a braking force, and at the time of parking by a parking brake, the drive force from the motor 39 is transmitted to the piston 18 via the spur gear multi-stage reduction mechanism 44, the planetary gear reduction mechanism 45, and the rotary-to-linear motion conversion mechanism 43 to move the piston 18 forward so that the disc rotor D is sandwiched between the pair of inner and outer brake pads 2 and 3 to generate a braking force, but may be employed in a disc brake in which, without using the brake hydraulic pressure supplied into the cylinder 15 of the caliper body 6, the disc rotor D is sandwiched between the pair of inner and outer brake pads 2 and 3 by the drive force of the motor 39 to generate a braking force.

Description of Symbols

| | |
|---|---|
| 1a, 1b, 1c: disc brake | 2: inner brake pad |
| 3: outer brake pad | 6: caliper body |
| 15: cylinder | 18: piston |
| 39: motor | |
| 43: rotary-to-linear motion conversion mechanism (piston propulsion mechanism) | |
| 45: planetary gear reduction mechanism | |
| 56: input gear portion (input portion) | |
| 57: boss portion | 58: output gear portion (gear portion) |
| 59: sun gear | 60: planetary gear |
| 61: internal gear | 78: gear portion |
| 82: inner teeth | 83: internal gear portion |
| 84: annular wall portion | |
| 85: cylindrical support portion (support portion) | |
| 88: annular surface | 225: sun gear |
| 232: cylindrical wall portion (cylindrical stepped portion) | |
| 300: sun gear | 310: cylindrical wall portion |
| 311: support portion | 313: projection |
| D: disc rotor | |

The invention claimed is:

1. A disc brake comprising:
a pair of pads each disposed on both sides of an axial direction of a rotor interposed therebetween;
a piston configured to push at least one of the pair of pads against the rotor;
a caliper body including a cylinder in which the piston is movably accommodated;
a motor provided on the caliper body;
a planetary gear reducer configured to boost and transmit rotation from the motor; and
a piston propeller configured to propel the piston to a braking position by rotation transmitted thereto from the planetary gear reducer,
wherein the planetary gear reducer includes:
a sun gear including an input gear to which the rotation from the motor is transmitted and an output gear extending axially from a radial central region of the input gear;
a plurality of planetary gears arranged to mesh with the output gear of the sun gear and surround the output gear; and
an internal gear arranged to mesh with each planetary gear and surround the planetary gear, and
wherein the internal gear includes:
an internal gear body including an inner teeth that meshes with gears of the plurality of planetary gears;
an annular wall extending from an axial end of the internal gear body toward a radial center side to restrict movement of each planetary gear in an axial direction; and
a support formed in a cylindrical shape and configured to rotatably support the sun gear and extend from an inner peripheral side end of the annular wall toward a direction of being away from the internal gear body in an axial direction of the sun gear, and
wherein the support contacts the sun gear on an outer periphery of the cylindrical shape.

2. The disc brake according to claim 1, wherein the support is formed with an annular surface extending along the axial direction of the sun gear.

3. The disc brake according to claim 1, wherein the sun gear is provided with a boss that extends axially within a range from the radial central region of the input gear to the output gear, and wherein the boss of the sun gear is rotatably supported on the support of the internal gear.

4. The disc brake according to claim 1, wherein the sun gear includes a cylindrical step extending axially from the input gear, and wherein the support of the internal gear is disposed radially inside the step of the sun gear, so that the step of the sun gear is rotatably supported on the support of the internal gear.

5. The disc brake according to claim 3, wherein an annular groove is formed in one end surface of the boss.

6. The disc brake according to claim 1, wherein the internal gear further includes a cylindrical engaging portion integrally and axially extending in a tubular shape from an end of the internal gear body.

7. The disc brake according to claim 3, wherein the planetary gear reducer further includes a bush arranged between the boss of the sun gear and the support of the internal gear.

8. A disc brake comprising:

a pair of pads each disposed on both sides of an axial direction of a rotor interposed therebetween;

a piston configured to push at least one of the pair of pads against the rotor;

a caliper body including a cylinder in which the piston is movably accommodated;

a motor provided on the caliper body;

a planetary gear reducer configured to boost and transmit rotation from the motor; and a piston propeller to propel the piston to a braking position by rotation from the planetary gear reducer, wherein the planetary gear reducer includes:

a sun gear including an input gear to which the rotation from the motor is transmitted and an output gear extending axially from a radial central region of the input gear;

a plurality of planetary gears arranged to mesh with the output gear of the sun gear and surround the output gear;

an internal gear arranged to mesh with each planetary gear and surround the planetary gear, and wherein the internal gear includes a support having a tubular shape and configured to rotatably support the sun gear on an outer peripheral surface thereof, a cylindrical wall, and an internal gear body including an inner teeth formed inside the cylindrical wall to mesh with gears of the plurality of planetary gears, and wherein the support is configured with a plurality of projections protruding radially outward from an outer peripheral surface of the cylindrical wall, arranged at an interval along a circumferential direction, and rotatably supporting an inner peripheral surface of the input gear of the sun gear.

9. The disc brake according to claim 8, wherein each of the plurality of projections is formed within a range from one end to another end of the cylindrical wall.

* * * * *